(12) United States Patent
Maharjan et al.

(10) Patent No.: US 12,344,716 B2
(45) Date of Patent: Jul. 1, 2025

(54) HYDROGEL WITH SELECTIVE ABSORPTION FOR SEPARATION OF LIQUID MIXTURES

(71) Applicant: THE UNIVERSITY OF KANSAS, Lawrence, KS (US)

(72) Inventors: Anjana Maharjan, Lawrence, KS (US); Mohammadamin Ezazi, Lawrence, KS (US); Gibum Kwon, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 1271 days.

(21) Appl. No.: 16/968,953

(22) PCT Filed: Feb. 12, 2019

(86) PCT No.: PCT/US2019/017724
§ 371 (c)(1),
(2) Date: Aug. 11, 2020

(87) PCT Pub. No.: WO2019/157530
PCT Pub. Date: Aug. 15, 2019

(65) Prior Publication Data
US 2020/0399430 A1 Dec. 24, 2020

Related U.S. Application Data

(60) Provisional application No. 62/629,356, filed on Feb. 12, 2018.

(51) Int. Cl.
*C08J 3/075* (2006.01)
*C08F 220/22* (2006.01)
(Continued)

(52) U.S. Cl.
CPC ............ *C08J 3/075* (2013.01); *C08F 220/22* (2013.01); *C08F 220/56* (2013.01);
(Continued)

(58) Field of Classification Search
CPC .... C08J 3/075; C08J 2333/16; C08J 2433/24; C08F 220/22; C08F 220/24; C08F 220/54;
(Continued)

(56) References Cited

U.S. PATENT DOCUMENTS 4,591,441 A    5/1986  Sakai
5,334,681 A *  8/1994  Mueller ............. C08G 18/8116
                                                      526/279
(Continued)

FOREIGN PATENT DOCUMENTS

CN    103881013 A  *  6/2014

OTHER PUBLICATIONS

PCT Application No. PCT/US19/17724, International Preliminary Report on Patentability, dated Aug. 18, 2020, nine pages.

*Primary Examiner* — Ling Siu Choi
*Assistant Examiner* — David L Miller
(74) *Attorney, Agent, or Firm* — Lathrop GPM LLP; Robert J. Lambrechts; Lisbeth Robinson

(57) ABSTRACT

Methods for synthesizing a hydrogel are disclosed. The method includes the steps of: (a) dissolving effective amounts of a monomer, a crosslinker, and a photoinitiator in deionized water, wherein the overall concentration is about 200 mg/ml; (b) preparing a solution of a fluorinated acrylate or diacrylate in ethanol wherein the overall concentration is about 200 mg/ml; (c) separately stirring the solutions prepared in steps (a) and (b) for approximately three hours; (c) gradually introducing the solution from step (b) into the solution from step (a); (d) stirring the resulting solution from
(Continued)

step (c) for about two hours; and (e) exposing the solution from step (d) to UV-A irradiation for about 15 minutes.

12 Claims, 25 Drawing Sheets

(51) Int. Cl.
*C08F 220/24* (2006.01)
*C08F 220/56* (2006.01)
*C08F 222/38* (2006.01)
*C08J 3/28* (2006.01)

(52) U.S. Cl.
CPC ............. *C08F 222/385* (2013.01); *C08J 3/28* (2013.01); *C08F 220/24* (2013.01); *C08J 2333/16* (2013.01); *C08J 2433/26* (2013.01)

(58) Field of Classification Search
CPC .... C08F 220/56; C08F 222/385; C08F 20/54; C08F 20/56; C08F 20/24; C08F 20/22; C08F 22/385
See application file for complete search history.

(56) References Cited

U.S. PATENT DOCUMENTS

| | | |
|---|---|---|
| 2003/0099682 A1 | 5/2003 | Moussy et al. |
| 2009/0280182 A1 | 11/2009 | Beck et al. |
| 2015/0166753 A1 | 6/2015 | Silverstein et al. |
| 2017/0327624 A1 | 11/2017 | Kourtis et al. |

\* cited by examiner

HYDROGEL WITH SELECTIVE ABSORPTION FOR SEPARATION OF LIQUID MIXTURES

CROSS-REFERENCE TO RELATED APPLICATIONS

This application claims priority to U.S. Provisional Patent Application No. 62/629,356 filed Feb. 12, 2018, the entirety of which is incorporated herein by reference.

BACKGROUND

Separation operations of liquid mixtures (immiscible or miscible) span across numerous manufacturing industries including petrochemicals, textiles, leather, wastewater treatment and biofuel production. According to a recent report, separation operations account for a quarter of all in-plant energy consumption in the United States.

One of the most ubiquitous immiscible liquid mixtures is oil and water. A large amount of oily wastewater is produced every day during industrial processing. The effect of this wastewater on the environment can be severe, unless it is adequately treated before discharge, as can be observed from the many recent oil-spill disasters. In addition, shortage of freshwater has become a severe problem in the world, especially in certain underdeveloped regions. Purification of oily wastewater can enhance the amount of water available for use. Furthermore, expulsion of water from fuel oil is of great concern in petroleum and automobile industries because even a small amount of water in the fuel oil may damage engines, threatening the safety of the automobile.

The separation of miscible liquid mixtures is also important in many industries. For example, in the petroleum refining process, small amounts of miscible impurities including sulfur, nitrogen and metal compounds are separated from crude oil to produce fuel oil. Similarly, the high quality of biofuels such as bioethanol or biodiesel can only be produced by removing dissolved byproducts generated during the separation process. In addition, recovery of organic acids from agroindustrial wastewater is essential not only for environmental requirements, but also for economic benefits.

A large number of methodologies including distillation, liquid-liquid extraction and membranes have been used to separate miscible or immiscible liquid mixtures. Distillation separates components from a mixture based on differences in their boiling points. Since distillation is a simple and well-established technology, it is by far the most widely used separation process. However, distillation has low energy efficiency and it requires thermal stability of compounds at their boiling points. In addition, it is not suitable for the separation of components with similar boiling points such as azeotropes.

Liquid-liquid extraction is typically used to separate azeotropes and components with overlapping boiling points where simple distillation cannot be used. Liquid-liquid extraction is a separation technique that separates components of a liquid mixture by contact with another insoluble liquid. Components in a liquid mixture are separated based on their difference in solubility with the insoluble liquid. One primary challenge in liquid-liquid extraction is to increase contact between the two liquid phases for efficient mass transfer. This is typically achieved by employing energy-intensive ultrasonication or pumping the two liquids through packed columns with high tortuosity.

Membrane-based technologies physically separate a liquid mixture into its components by allowing one phase to permeate through the membrane while retaining the other component. Since the separation is performed at ambient temperature without chemically altering the components, membrane-based separation operations consume less energy than other separation methods. However, membranes can be fouled by particulates or organic matters during the separation operation, which results in a decline of the permeability.

Absorption can be a useful alternative for the separation of either miscible or immiscible liquid mixtures. Embodiments of absorption techniques are described herein for the purpose of separating miscible and/or immiscible liquid mixtures.

SUMMARY

The following presents a simplified summary of the invention in order to provide a basic understanding of some aspects of the invention. This summary is not an extensive overview of the invention. It is not intended to identify the critical elements of the invention or to delineate the scope of the invention. Its sole purpose is to present some concepts of the invention in a simplified form as a prelude to the more detailed description that is presented herein.

In one embodiment, a hydrogel has effective amounts of: N-isopropylacrylamide (NIPAM); N,N' Methylenebisacrylamide (MBAA); 2-hydroxy-2-methylpropiophenone; and 1H,1H,2H,2H-perfluorodecyl acrylate. The hydrogel has the following chemical structure:

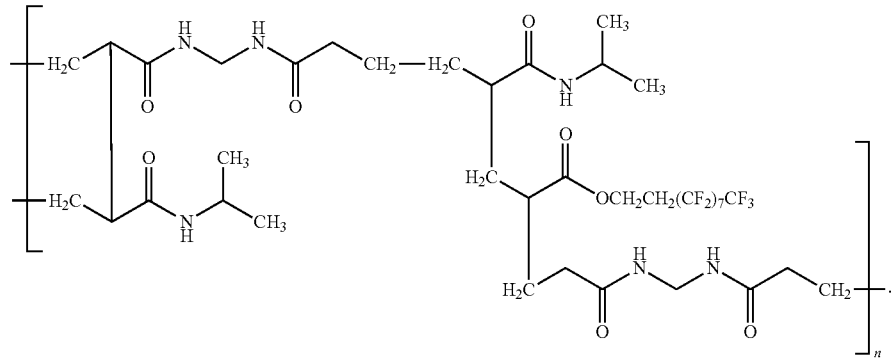

In another embodiment, a method for synthesizing a hydrogel includes the steps of: (a) dissolving N-isopropylacrylamide, N,N' Methylenebisacrylamide (MBAA) and 2-hydroxy-2-methylpropiophenone in deionized water to form a NIPAM solution; (b) preparing a solution of 1H,1H, 2H,2H-Perfluorodecyl acrylate in ethanol; (c) separately stirring the solutions prepared in steps (a) and (b) for approximately three hours; (c) gradually introducing the solution from step (b) into the solution from step (a); (d) stirring the resulting solution from step (c) for about two hours; and (e) pouring the resulting solution from step (d) into a mold and irradiating with UV-A ($\lambda$=365 nm) for about 15 minutes.

In still another embodiment, methods for synthesizing a hydrogel are disclosed. The method includes the steps of: (a) dissolving effective amounts of a monomer, a crosslinker, and a photoinitiator in deionized water, wherein the overall concentration is about 200 mg/ml; (b) preparing a solution of a fluorinated acrylate or diacrylate in ethanol wherein the overall concentration is about 200 mg/ml; (c) separately stirring the solutions prepared in steps (a) and (b) for approximately three hours; (c) gradually introducing the solution from step (b) into the solution from step (a); (d) stirring the resulting solution from step (c) for about two hours; and (e) exposing the solution from step (d) to UV-A irradiation for about 15 minutes.

BRIEF DESCRIPTION OF THE DRAWINGS

FIG. 19 shows that equilibrium swelling ratio for a given liquid is not significantly altered by polymer mass.

DETAILED DESCRIPTION

Figure 1:
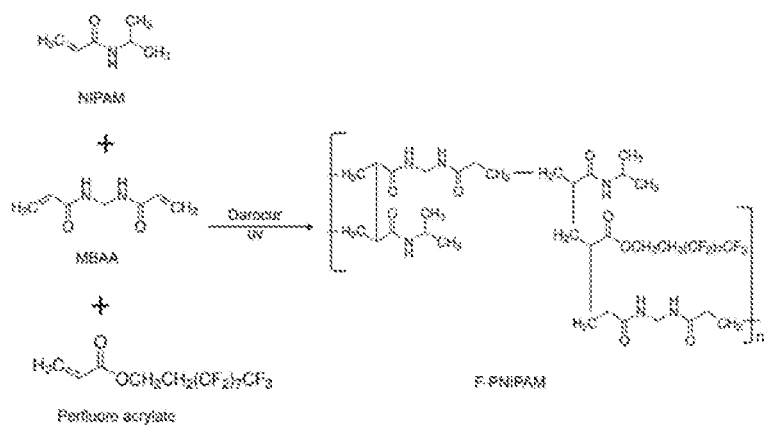
FIG. 1 is a schematic illustration the synthesis of F-PNIPAM.

Described herein are hydrogels with selective wettability of water (polar liquid) over oil (non-polar liquid) and methods for synthesizing same. As is described in greater detail below, the hydrogels set forth herein may selectively absorb polar liquid while repel non-polar liquid. Utilizing such a highly selective absorption behavior, it may be possible to almost completely separate both immiscible oil-water mixtures and miscible polar-non-polar liquid mixtures.

A hydrogel is a three-dimensional polymer that can hold water in its network when submerged in water. Due to such a unique ability to absorb water, hydrogels have been widely studied and applied in a range of applications. Common examples of hydrogels are polyethylene glycol (PEG), polyvinyl alcohol (PVA), hydroxypropyl cellulose (HPC), polyacrylamide (PAM), etc.

Poly N-isopropylacrylamide (PNIPAM) is a thermo-responsive hydrogel that can show different water absorption behavior as a function of temperature. For example, PNIPAM readily gets wet by water (that is, hydrophilic) and absorbs it at a relatively lower temperature (T<32° C.). At an elevated temperature (T>32° C.), PNIPAM becomes hydrophobic (that is, repellent to water) and releases water retained within its network. The temperature (T=32° C.) at which PNIPAM undergoes the transition between absorbing and releasing water is known as lower critical transition temperature (LCST). Such a thermo-responsive switching of water-wettability of PNIPAM has led to several reports of separating oil-water mixtures upon heating and cooling. However, these reports often failed to characterize the wettability (or absorption) of oils by the PNIPAM. Almost all hydrogel is hydrophilic and oleophilic (wet by oil) unless it is carefully designed and synthesized to possess selective wettability. The hydrogels described herein uniquely exhibit in-air hyrophilicity and oleophobicity.

Liquids can be considered either polar or non-polar. Polar liquids (such as water, alcohols and acetone) possess a dipole in their molecules, while non-polar liquids (such as alkanes, benzene, toluene, etc.) do not. Typically, polar (e.g., water) and non-polar (e.g., oil) liquids do not mix together. They form two separate phases when they contact each other. However, there are a few pairs of polar and non-polar liquids that are completely miscible.

One of the well-known examples of an immiscible liquid mixture is oil and water. Oil-water mixtures are classified, in terms of the diameter (d) of the dispersed phase, as free oil and water if d>150 μm, a dispersion if 20 μm<d<150 μm, or an emulsion if d<20 μm. When a surfactant is introduced, the stability of an oil-water mixture is significantly enhanced. This is because surfactant can effectively lower the interfacial tension ($\gamma_{ow}$) of oil and water. Examples of surfactants that are typically used to stabilize oil-water emulsions (or dispersions) include but are not limited to sodium dodecylsulfate (SDS), Sorbitan monooleate (e.g., Tween80, Span80, Span120, etc.), and Sorbitan monolaurate (e.g., Tween20, Span20, Tween21, etc.).

In some cases, polar and non-polar liquids can completely mix together to form a homogeneous single phase. Examples of such miscible mixtures are ethanol-heptane, butanol-hexane and methanol-diesel fuel. These miscible liquids can be found in various industrial process including biodiesel production, jet fuel purification and pharmaceutical process.

Distillation is widely used to separate the miscible liquid mixtures. However, the disadvantages of distillation include its low energy efficiency and that it requires thermal stability of compounds at their boiling points. Large energy savings could be obtained by replacing distillation with low-energy intensity operations, such as absorption.

Synthesis of F-PNIPAM Hydrogel

In one example of the invention, a simple free radical polymerization method initiated with ultraviolet (UV) light to synthesize fluorinated PNIPAM (F-PNIPAM) was employed. First, N-isopropylacrylamide (NIPAM), N, N' Methylenebisacrylamide (MBAA), and Darocur1173 (2-hydroxy-2-methylpropiophenone) were dissolved in deionized (DI) water in 97:1:2 weight ratio (NIPAM solution). NIPAM, MBAA and Darocur1173 are monomer, crosslinker and photoinitiator, respectively. The overall concentration of the solution is about 200 mg/ml.

A solution of 1H,1H,2H,2H-Perfluorodecyl acrylate (perfluoro acrylate solution, or F-acrylate) was separately prepared in ethanol with substantially the same concentration (e.g., about 200 mg/ml). The prepared solutions are then separately stirred for about 3 hours using a mechanical stirrer in dark conditions to prevent light exposure and unexpected cross-linking. Subsequently, perfluoro acrylate solution is gradually introduced to the NIPAM solution, followed by a vigorous stirring for about 2 hours. The ratio of 1H,1H,2H,2H-Perfluorodecyl acrylate and NIPAM is maintained at 9:1. The solution was then poured into a cubical mold (1.2 cm×1.2 cm) followed by UV-A ($\lambda=365$ nm) irradiation for 15 mins. This leads to photoinitiation of free radical polymerization and crosslinking.

It shall be noted that 1H,1H,2H,2H-Perfluorodecyl acrylate (F-acrylate) can be replaced by other fluorinated acrylates (or diacrylates) including but not limited to 1H,1H,6H, 6H-Perfluoro-1,6-hexandiol diacrylate, 1H,1H-perfluoro-n-octyl methacrylate, and 1H,1H-perfluoro-n-octyl acrylate, all of which are contemplated within the scope of the invention.

FIG. 1 shows a schematic illustration of synthesizing F-PNIPAM. Upon UV irradiation, Darocur1173 forms radicals that can initiate the bond cleavage of MBAA, NIPAM and perfluoro acrylate. Here it is believed that NIPAM and perfluoro acrylate are copolymerized whereas MBAA cross-links the polymers. After 15 mins of UV irradiation, a three-dimensional polymer network of F-PNIPAM is obtained.

Figure 2:
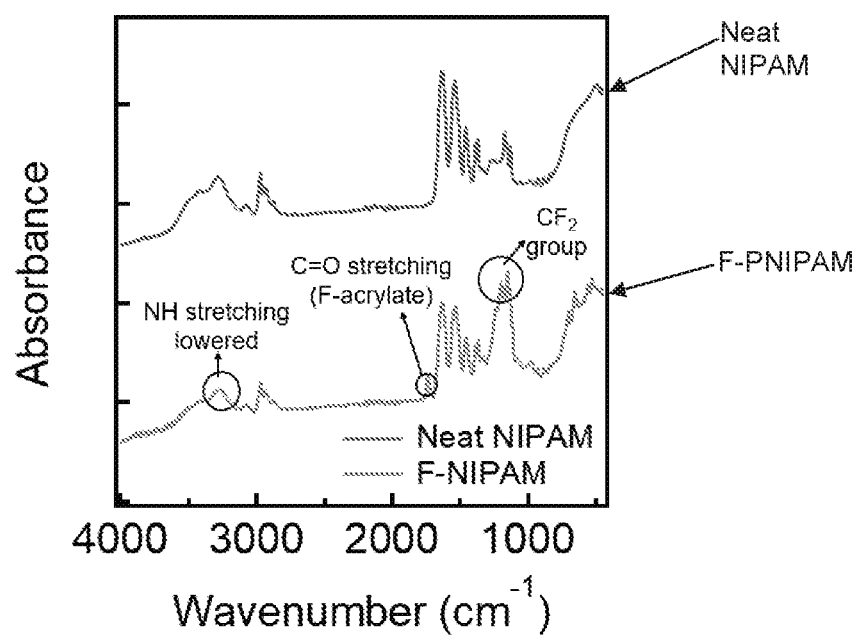
FIG. 2 is a plot showing Fourier-transform infrared spectroscopy absorption spectrum for NIPAM and F-PNIPAM.

Fourier-transform infrared spectroscopy (FTIR) was used to identify the chemical structure of F-PNIPAM and to ensure the copolymerization of PNIPAM with F-acrylate. Before conducting the FTIR analysis, a F-PNIPAM film, prepared by drop casting on a glass slide, was dried to remove the water vapor present in the film. The sample was then scanned at the rate of 5 cm$^{-1}$ resolution and the absorption peaks were monitored and compared with the absorption peaks of NIPAM and F-acrylate. FIG. 2 is a plot showing FTIR absorption spectrum for NIPAM (top line) and F-PNIPAM (bottom line).

The peaks between 1,200 cm$^{-1}$ and 1,250 cm$^{-1}$ in F-PNIPAM spectrum in FIG. 2 are due to the $CF_2$ group from F-acrylate. Similarly, due to the presence of $CF_2$—$CF_3$ end group from F-acrylate, an absorption peak is observed at around 1,153 cm$^{-1}$. The absorption peak at around 1,741 cm$^{-1}$ is attributed to the presence of C=O stretching from F-acrylate. This confirms that NIPAM and F-acrylate are copolymerized resulting in the chemical structure shown in FIG. 1. The characteristic peak at 3,400 cm$^{-1}$ due to the intense NH stretching is lowered in the F-PNIPAM, indicating that NIPAM and F-acrylate are copolymerized.

Figure 3:
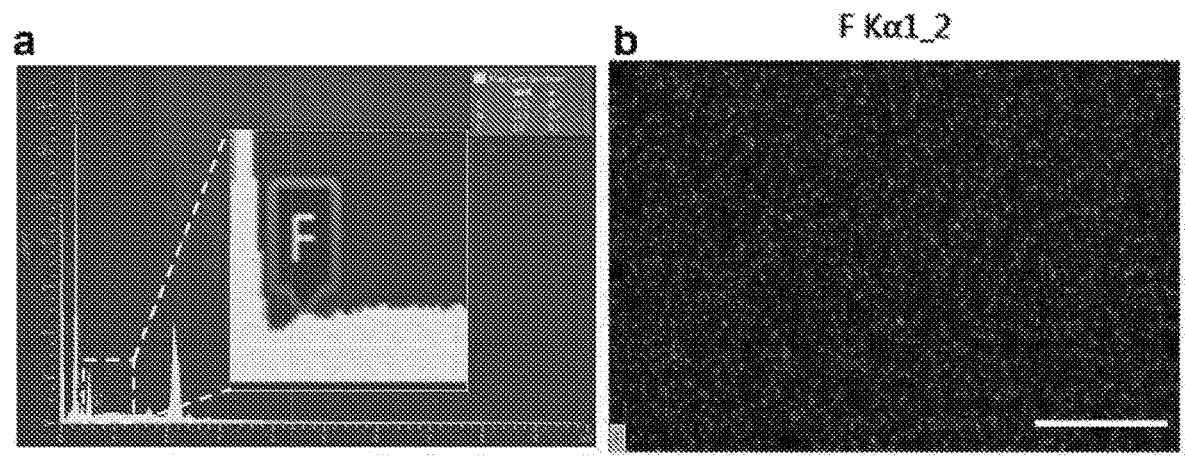
FIG. 3A is an EDS elemental spectrum on F-PNIPAM.
FIG. 3B is an EDS elemental mapping of fluorine, wherein the scale bar represents 100 micrometers.

Energy Dispersive X-ray Spectroscopy (EDS) was performed to determine the surface chemistry of F-PNIPAM. EDS was performed in conjunction with Scanning Electron Microscope (SEM). FIGS. 3A and 3B show the EDS elemental analysis and mapping, respectively, on the F-PNIPAM copolymerized with 10 wt. % of F-acrylate. In FIG. 3A, the insert shows the elemental spectrum zoomed in to highlight fluorine. In FIG. 3B, the spots indicate the fluorine elements. The F-PNIPAM samples were sputter-coated with 20 nm of gold to prevent charging. Here, the entire surface of the F-PNIPAM is covered by fluorine (F). Fluorine originates from $CF_2$ and $CF_3$ groups of F-acrylate.

Wettability

Figure 4:
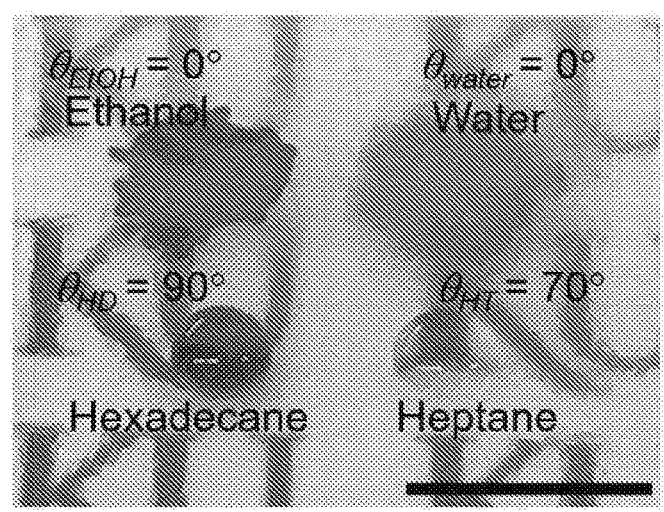
FIG. 4 is a photograph showing the contact angles for ethanol, water, hexadecane, and heptane droplets on a F-PNIPAM coated surface at room temperature (T=21° C.).

The wettability switch of the F-PNIPAM with a change in ambient temperature was studied. First, a thin film of 10 wt. % F-PNIPAM was fabricated on a small piece of glass. Contact angles (θ) for water, ethanol, hexadecane, and heptane were determined at room temperature (T=21° C.) and at elevated temperature (T=40° C.). At room temperature, it was found that the water and ethanol contact angle (θ) is 0° whereas that of hexadecane is 90° and heptane is 70° (FIG. 4). The oil repellency of the F-PNIPAM can be attributed to perfluoro acrylate molecules which lowers the solid surface energy.

Figure 5:
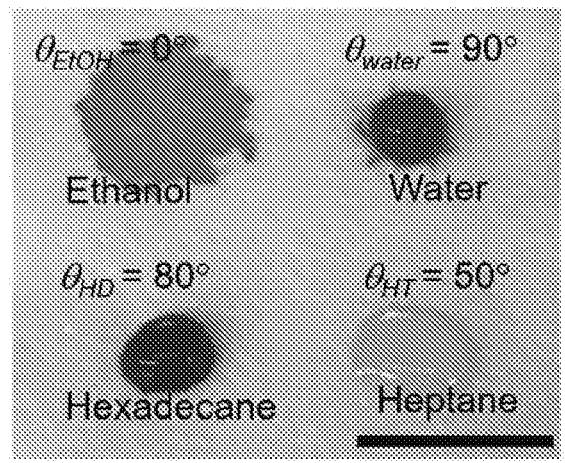
FIG. 5 is a photograph showing the contact angles for ethanol, water, hexadecane, and heptane droplets on a F-PNIPAM coated surface at elevated temperature (T=40° C.).

Referring now to FIG. 5, at an elevated temperature (T=40° C.), it was found that $\theta_{water}=90°$ whereas that of ethanol, hexadecane, and heptane remains relatively unchanged ($\theta_{ethanol}=0°$, $\theta_{hexadecane}=80°$, $\theta_{heptane}=50°$). This indicates that the F-PNIPAM becomes hydrophobic when the temperature is above the LCST of F-PNIPAM (which was found to be 28.7° C., as described below). Such wettability switch can be attributed to the hydrophilic-hydrophobic balance in the PNIPAM network. As described above, PNIPAM is composed of both hydrophilic (amide) and hydrophobic (isopropyl) groups. When the temperature is below the LCST for PNIPAM, the amide group and hydrogen from water bond with each other. However, when the temperature is above the LCST, the hydrogen bond is weakened and the hydrophobic interaction between the isopropyl groups increases. The prevailing hydrophobic interaction results in repelling the water when the temperature is above the LCST.

Figure 6:
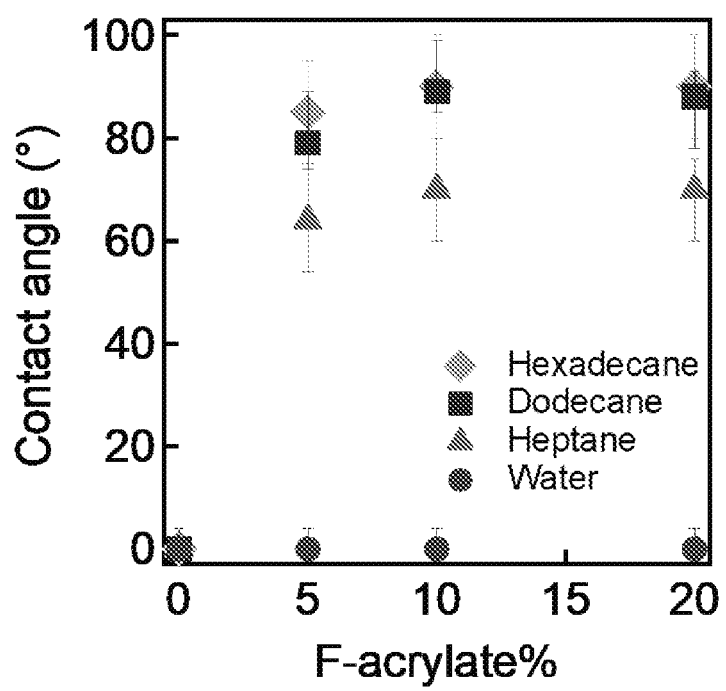
FIG. 6 is a plot showing contact angles of water and various oils on the surface of F-PNIPAM as a function of wt. % of F-acrylate below LCST (T=21° C.).
Figure 7:
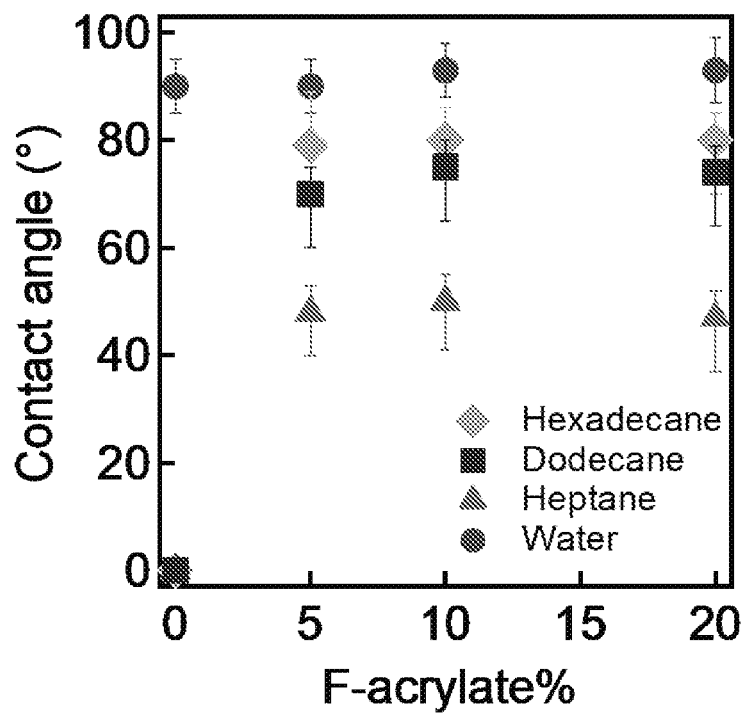
FIG. 7 is a plot showing contact angles of water and various oils on the surface of F-PNIPAM as a function of wt. % of F-acrylate above LCST (T=40° C.).

The wettability of F-PNIPAM copolymerized with various compositions of F-acrylate was also studied. FIG. 6 shows a plot of the contact angles for various polar and non-polar liquids on F-PNIPAM surfaces with different F-acrylate compositions at T=21° C. FIG. 7 is a plot of the contact angles for various polar and non-polar liquids on F-PNIPAM surfaces with different F-acrylate compositions at T=40° C.

Figure 8:
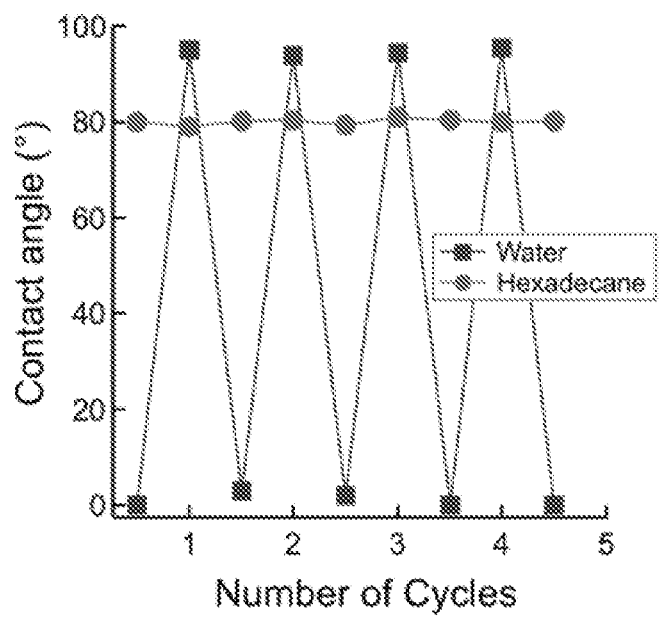
FIG. 8 is a graph showing wettability for water and hexadecane contact angles through repeated cycles of heating and cooling.

Surprisingly, it was determined that the F-PNIPAM can reversibly switch its wettability to water by repeated heating-cooling cycles, while maintaining its oil repellency. FIG. 8 illustrates the reversible wettability switching for water while maintaining hexadecane contact angles through repeated five cycles of heating and cooling. The F-PNIPAM is effective in the separation of polar-non-polar liquid mixtures, such as immiscible oil-water mixture or miscible ethanol-heptane mixture due to its selective wettability of polar liquid over non-polar liquid. For comparison, the wettability switch of a neat PNIPAM (that is, without perfluoro acrylate) surface upon temperature change was also considered. At room temperature (T=21° C.), it shows both $\theta_{water}=0°$ and $\theta_{hexadecane}=0°$. At an elevated temperature (T=50° C.), water contact angle becomes 95° whereas $\theta_{hexadecane}$ is still 0°. This observation is similar with those reported in the previous literature.

Lower Critical Transition Temperature

Figure 9:
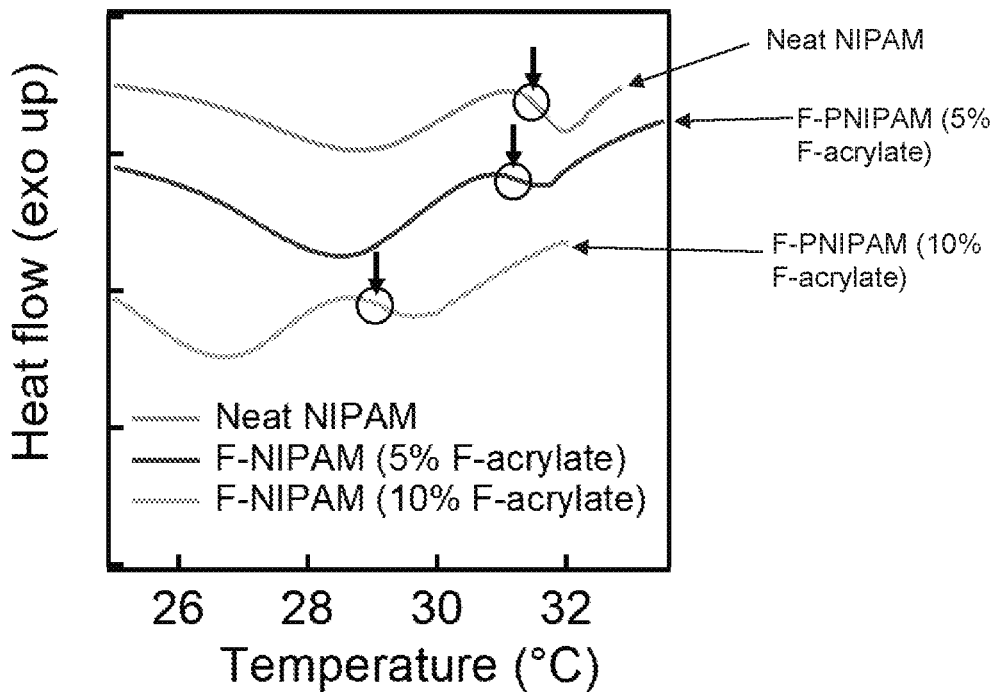
FIG. 9 is a plot showing DSC data for various concentrations of F-acrylate.

The LCST of PNIPAM can be altered by co-polymerization. Copolymerizing with hydrophilic materials typically increases the LCST of PNIPAM, whereas hydrophobic materials can result in a decrease in LCST. Various characterization methods have been utilized to determine LCST of copolymerized PNIPAM including Differential Scanning calorimetry (DSC), cloud point, and UV-Vis spectrometry to characterize turbidity and light scattering. Here, DSC was used to determine the LCST of the F-PNIPAM. FIG. 9 shows that the LCST of F-PNIPAM was found to be 28.7° C., which is about 3.3° C. lower than that of a neat PNIPAM at about 32° C.). The LCST of F-PNIPAM may be further reduced by increasing the ratio of 1H,1H,2H,2H-Perfluorodecyl acrylate (F-acrylate) to PNIPAM. FIG. 9 is a DSC plot for F-PNIPAM for different F-acrylate concentrations (the top line represents neat PNIPAM, the middle line represents 5% F-acrylate F-PNIPAM, and the bottom line represents 10% F-acrylate F-PNIPAM). The endothermic peaks, indicated by arrows in FIG. 9, show the LCST of F-PNIPAM for each concentration of F-acrylate. It was found that the LCST decreases with increasing the concentration of F-acrylate, which was affirmed by the shift in the endothermic peaks to a lower temperature. The LCST for each of the F-acrylate concentrations are shown in the table below.

| F-acrylate wt. % | LCST of copolymer (° C.) |
| --- | --- |
| 0 | 31.8 ± 1.0 |
| 5 | 31.0 ± 1.0 |
| 10 | 28.9 ± 1.0 |

The shift in the corresponding endothermic peaks can be attributed to the copolymerization of PNIPAM with hydrophobic F-acrylate. The lower value of LCST for the F-NIPAM is favorable to release and collect the absorbed liquid (water) at a lower temperature.

Surface Energy

The Owens-Wendt method utilizes the Young's relation (Eqn. 1) and the Fowke's postulation (Eqn. 2) to estimate the surface energy ($\gamma_{SV}$) from the liquid contact angles.

$$\cos\theta = \frac{\gamma_{SV} - \gamma_{SL}}{\gamma_{LV}} \quad (1)$$

$$\gamma_{SL} = \gamma_{SV} + \gamma_{LV} - 2\sqrt{\gamma_{SV}^d \gamma_{LV}^d} - 2\sqrt{\gamma_{SV}^p \gamma_{LV}^p} \quad (2)$$

$$\gamma_{SV} = \gamma_{SV}^d + \gamma_{SV}^p \quad (3)$$

$$\gamma_{SV}^d = \gamma_{LV}\left(\frac{1+\cos\theta}{2}\right)^2 \quad (4)$$

$$\gamma_{SV}^p = \frac{1}{\gamma_{SV}^p}\left[\frac{\gamma_{LV}(1+\cos\theta)}{2} - \sqrt{\gamma_{SV}^d \gamma_{SV}^p}\right]^2 \quad (5)$$

Here, $\gamma_{SV}^d$ is the dispersive component that accounts for the dispersive forces while $\gamma_{SV}^p$ is the polar component that accounts for polar forces such as hydrogen-bond or dipole-dipole interaction. The table below shows the surface energy of F-NIPAM. To calculate the dispersive component ($\gamma_{SV}^d$), the contact angle (OHD) and surface tension of hexadecane ($\gamma$HD=27.5 mN/m) were used in Eqn. 4. The calculated dispersive component ($\gamma_{SV}^d$) along with the water contact angle were used to calculate the polar component of surface energy ($\gamma_{SV}^p$) using Eqn. 5. Here, the dispersive and polar components of water surface tension are $\gamma_{LV}^d=21.1$ mN/m and $\gamma_{LV}^p=51.0$ mN/m, respectively. The total surface energy ($\gamma_{SV}$) of F-NIPAM is calculated by summing up the dispersive and polar surface energy components.

| Wt. % of F-acrylate | $\gamma_{SV}^d$ (mN/m) | $\gamma_{SV}^p$ (mN/m) | $\gamma_{SV}$ (mN/m) |
| --- | --- | --- | --- |
| 0 | 27.5 | 45.2 | 72.7 |
| 5 | 8.1 | 5.5 | 13.6 |
| 10 | 6.9 | 2.7 | 9.5 |
| 20 | 6.9 | 3.2 | 10.1 |

Figure 10:
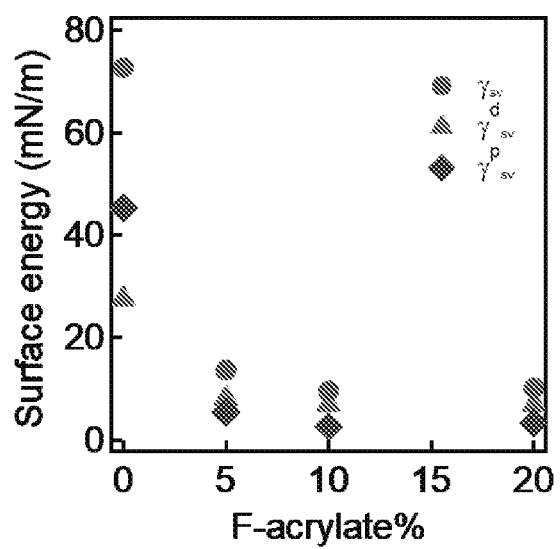
FIG. 10 is a plot showing the surface energy of F-PNIPAM as a function of wt. % F-acrylate, wherein $\gamma_{SV}^d$ is the dispersive component, $\gamma_{SV}^p$ is the polar component, and $\gamma_{SV}$ is the surface energy.

Adding fluorinated materials to a surface lowers the surface energy. Therefore, the surface energy of the F-PNIPAM can be lowered by increasing the wt. % of F-acrylate. This results in higher contact angles for contacting liquids. The hexadecane and water contact angles on F-NIPAM were used to calculate the surface energy. The surface energy of F-NIPAM decreases with increasing the F-acrylate composition, as shown in FIG. 10. At 10 wt. % F-acrylate, F-NIPAM is completely covered with fluorine leading to the minimum surface energy.

Absorption Tests

Example 1

Figure 11:
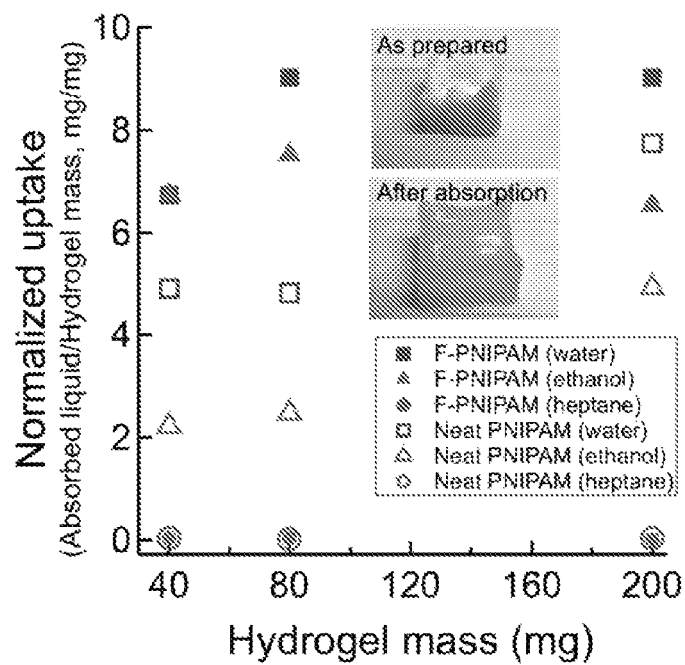
FIG. 11 is a graph showing normalized uptake of liquids as a function of F-PNIPAM weight.

Absorption tests were conducted to verify that the F-PNIPAM can selectively absorb polar liquid (water) while repelling non-polar liquid (oil). First, F-PNIPAM cubes were fabricated. Subsequently, the prepared F-PNIPAM cube was completely submerged in a desired liquid bath. After 1 hour, the weight of F-PNIPAM cube was measured and normalized against an as-prepared cube. FIG. 11 shows a plot of normalized uptake as a function of hydrogel mass. Here, a normalized uptake is defined as mass of absorbed liquid (water or ethanol) for 1 hour/hydrogel mass. Only polar liquids (water and ethanol) were absorbed by the F-PNIPAM while non-polar liquids (heptane) remain unchanged in their weight. For comparison, the absorption test was also conducted using neat PNIPAM. It was found that neat PNIPAM can also absorb polar liquids while repelling non-polar liquid. Interestingly, the values of normalized uptake increases with increasing the total mass of cube. This is likely due to the fact that the surface area of a cube with large mass (e.g., 200 mg) is much greater than that of a smaller cube (e.g., 40 mg), which enhances the rapid absorption.

It was also found that the F-PNIPAM can absorb approximately 1.3 times more polar liquids as compared with a neat PNIPAM cube. This is because of a so-called 'loosened' NIPAM polymer network of the F-PNIPAM due to the presence of perfluoro acrylate. Such a loosened polymer network can be also obtained by reducing crosslinking density.

Figure 12:
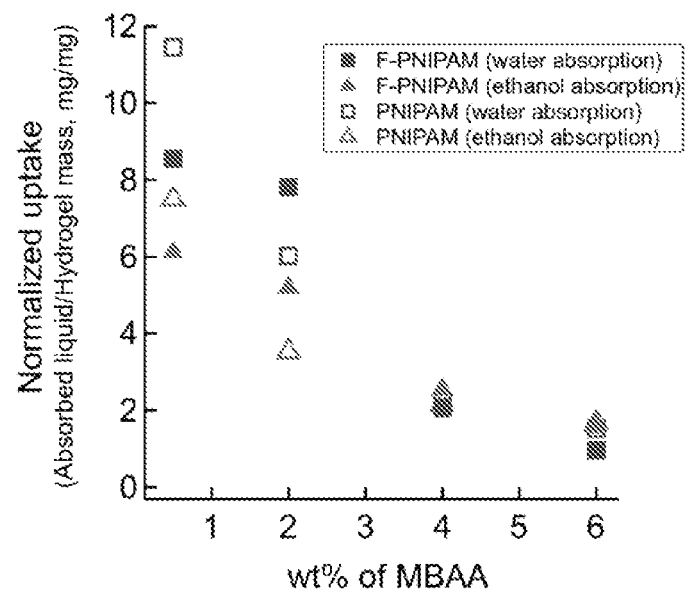
FIG. 12 is a graph showing normalized uptake of liquids as a function of crosslinker concentration in F-PNIPAM and PNIPAM.

In order to verify this, multiple F-PNIPAM cubes with different concentration of crosslinker (MBAA) were fabricated. Here 0.5 wt %, 2.0 wt %, 4.0 wt % and 6.0 wt % of MBAA were used. FIG. 12 shows a plot of normalized uptake as a function of MBAA concentration (wt %) in F-PNIPAM and neat PNIPAM. It clearly shows that the F-PNIPAM can absorb larger amount of water and ethanol when the crosslinker density is lower. A similar trend was also observed with neat PNIPAM.

Figure 13:
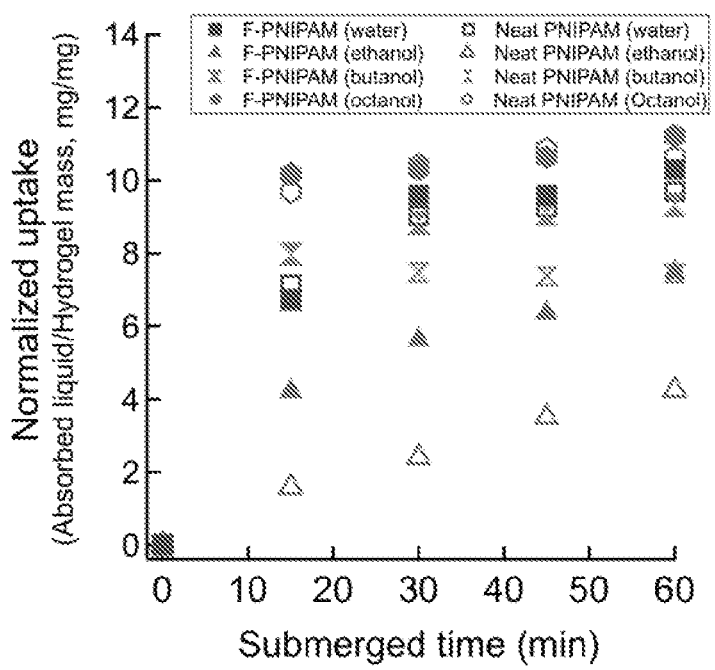
FIG. 13 is a graph showing normalized uptake of various liquids as a function of submerged time.

Time-dependent absorption of polar liquids of the F-PNIPAM was also observed. FIG. 13 shows a plot of normalized uptake as a function of submerged time. For comparison, the data obtained using neat PNIPAM is also shown. It clearly shows that F-PNIPAM quickly absorbs liquids after it is submerged. Such a rapid absorption is also observed in neat PNIPAM tests.

Figure 14:
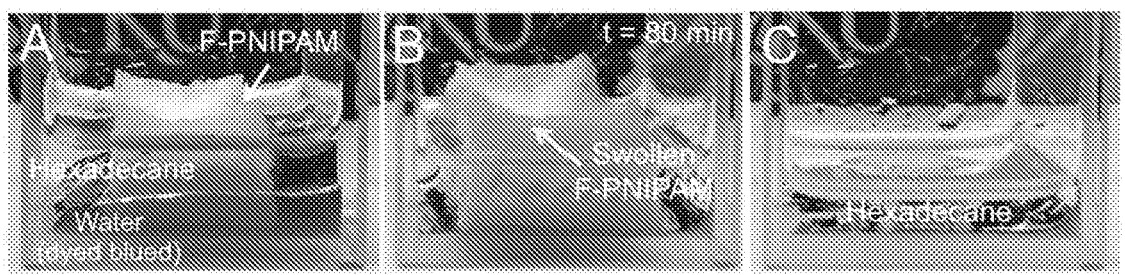
FIGS. 14A and 14B are photographs of separation of free hexadecane-water mixture using F-PNIPAM.
FIG. 14C is a photograph where almost all water is absorbed from the mixture shown in FIGS. 14A and 14B.

It has been demonstrated that the F-PNIPAM can absorb various polar liquids such as alcohols and water whereas non-polar liquids are not absorbed. Therefore, the F-PNIPAM may separate oil-water mixtures by selectively absorbing water. To illustrate, in a first instance, a free hexadecane and water with 50:50 vol %:vol % solution was first prepared. In the example, a total volume of the hexadecane-water mixture is about 4 mL. Subsequently the F-PNIPAM is completely submerged in the hexadecane-water mixture. After approximately 80 mins, it was observed that the F-PNIPAM can selectively absorb blue-dyed water from hexadecane-water mixture resulting in almost complete separation as shown in FIGS. 14A, B, and C. Specifically, FIGS. 14A and 14B, show sequential photographs of the separation of free hexadecane-water mixture using a F-PNIPAM cube. The water is denser, so it falls to the bottom of the container, with the less dense hexadecane floats atop the water. In 15B, the F-PNIPAM is swollen, having absorbed the water. In 14C, the F-PNIPAM, swollen with water, is removed, leaving substantially only the hexadecane.

Figure 24:
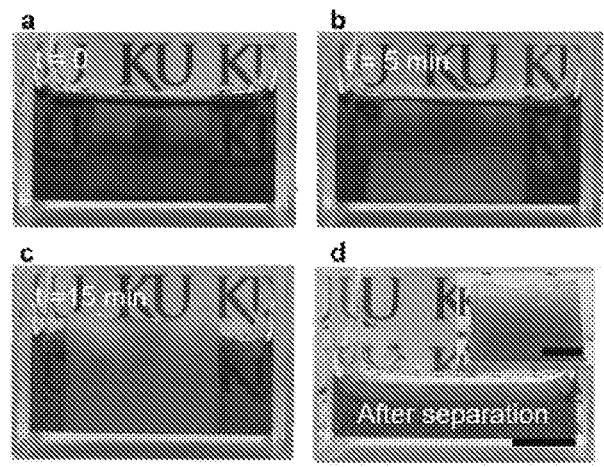
FIGS. 24A-D are a series of photographs showing the separation of a free hexadecane-water solution.
Figure 25:
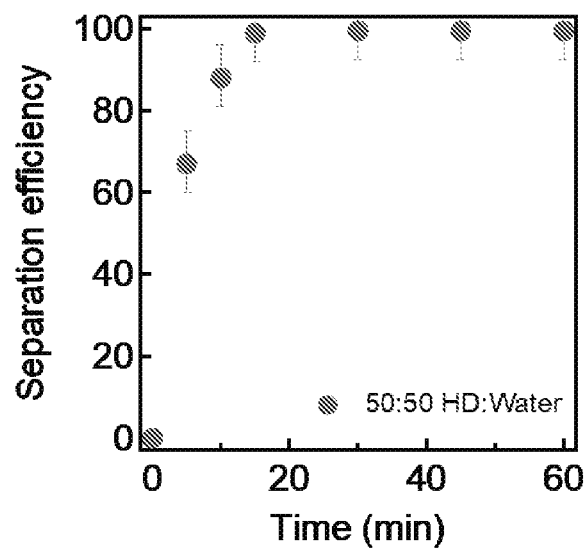
FIG. 25 is a plot showing the separation efficiency for free hexadecane and water as a function of time using F-PNIPAM.

In a second instance, a free hexadecane and water solution (50:50 vol %, total volume of about 6 mL) was prepared for separation using F-PNIPAM. The separation is illustrated in FIGS. 24A-D. In FIG. 24A, the F-PNIPAM is submerged in the 50:50 vol:vol solution. The hexadecane is less dense and therefore sits atop the water. In FIG. 24B, after 5 minutes, the water begins to be absorbed by the F-PNIPAM. In FIG. 24C, after 15 minutes, substantially all of the water is absorbed by the F-PNIPAM. In FIG. 24D, the F-PNIPAM cube is removed, leaving only the hexadecane. FIG. 25 shows a plot of separation efficiency for 50:50 vol:vol free hexadecane and water as a function of time. The separation efficiency is defined by $$\frac{S.R.}{S.R._{eq}} \times 100,$$

where $S.R._{eq}$ indicates the equilibrium swelling ratio and $S.R.$ is the swelling ratio at a time (t). In 15 minutes, the separation efficiency was found to be about 99%.

Figure 26:
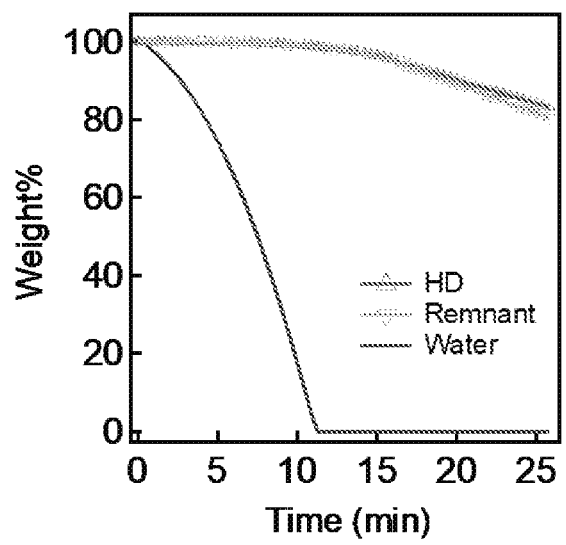
FIG. 26 is a thermogravimetric analysis (TGA) plot for the remnant after separation of free hexadecane and water. The plots for hexadecane and water are also included.

To determine the separation efficiency using thermogravimetric analysis (TGA), about 16 mg of a liquid was heated from 25° C. to 105° C. at a rate of 5° C./min and the temperature was held constant at 105° C. for 10 minutes. FIG. 26 shows the TGA plot for remnant after free hexadecane and water separation. The loss in weight of the remnant after the separation was compared with the weight loss of pure hexadecane and water to estimate the purity of the remnant. From this comparison, it was determined that the separation efficiency for free hexadecane and water mixture using the F-PNIPAM is about 99%.

Figure 27:
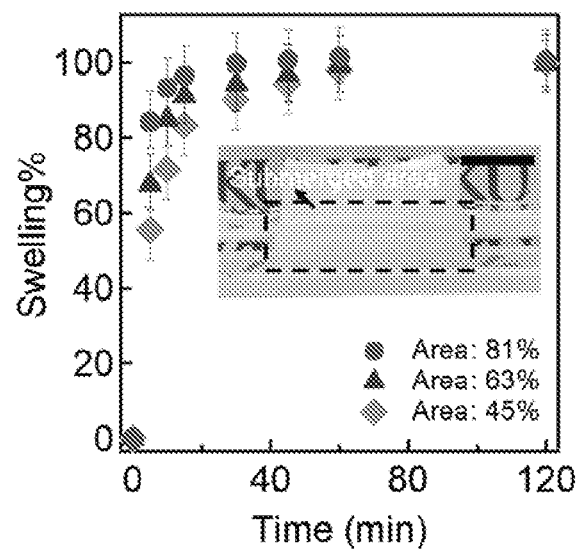
FIG. 27 is a plot showing swelling percentage as a function of submerged time when the submerged area of F-PNIPAM in water is varied.

FIG. 27 shows the time-dependent evolution of the swelling percentage with a various submerged (contact) area of F-PNIPAM in the water phase (see inset in FIG. 27). The swelling percentage is defined as the swelling ratio (S.R.) with respect to the equilibrium swelling ratio ($S.R._{eq}$) i.e.

$$\text{Swelling \%} = \frac{S.R.}{S.R._{eq}}.$$

Decreasing the submerged area of F-PNIPAM results in a slower swelling. This is because water is absorbed less when the submerged area is low. Although the swelling rate is affected by the submerged area, F-PNIPAMs could effectively reach to their equilibrium swelling after 120 minutes.

Example 2

So far it has been shown that the F-PNIPAM can absorb only polar liquids while repel non-polar liquids. This allows for almost complete separation of water from an immiscible oil-water mixture by selective absorption. Separating immiscible liquid mixtures (oil-water) via selective absorption using a sponge-like gel is relatively easy and has been demonstrated in literature. However, the separation of miscible liquid mixtures such as alcohol-alkane or alcohol-water through selective absorption of one phase over another is more challenging. Unlike immiscible liquids, miscible liquids typically possess similar physical or chemical properties.

Figure 15:
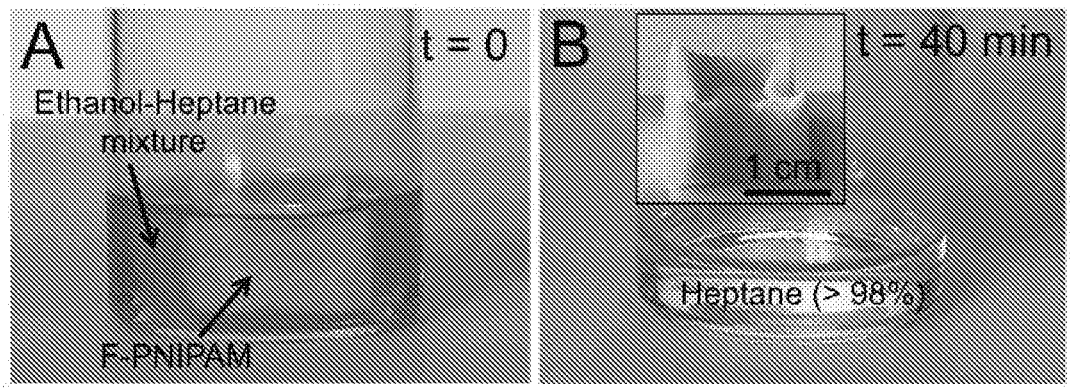
FIG. 15A is a photograph of F-PNIPAM submerged in a miscible ethanol-heptane mixture.
FIG. 15B is a photograph of the F-PNIPAM after 40 minutes in solution, swollen due to selective absorption of ethanol.

The F-PNIPAM was also tested for its ability to separate a miscible ethanol-heptane mixture. Note that ethanol and heptane are completely miscible. A 3 mL mixture of heptane and ethanol (2:1 vol %:vol %) was first prepared, and the F-PNIPAM cube was then fully submerged for about 40 min, as shown in FIG. 15A. Prior to mixing, the ethanol was dyed blue for ease of identification. After 40 minutes, the ethanol was almost completely absorbed by the F-PNIPAM, as shown in FIG. 15B, leaving the clear heptane in the container. Thus, the F-PNIPAM can selectively absorb ethanol from a completely miscible ethanol-heptane mixture.

Figure 16:
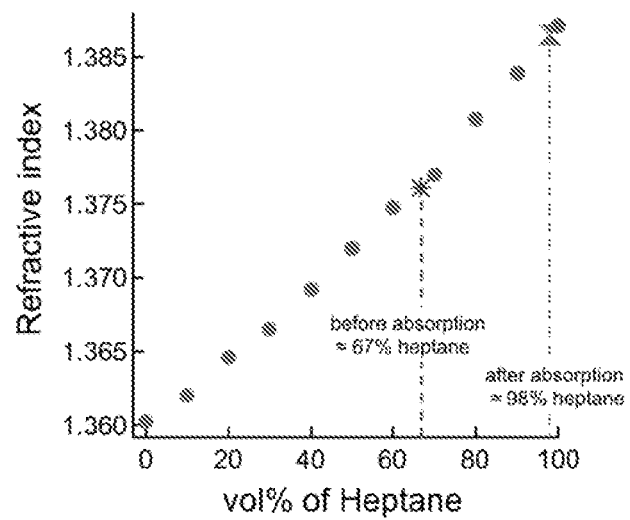
FIG. 16 is a graph showing refractive indices as a function of heptane vol % in ethanol-heptane 4 mixtures.

Refractive index (RI) measurements were conducted to verify the separation efficiency. The RI for a feed mixture of 1:2 vol:vol ethanol:heptane is 1.3761, as shown in FIG. 16. After 40 mintutes of absorption using the F-PNIPAM, the RI of the resulting liquid was found to be 1.3865. This value corresponds to approximately 98 vol % of heptane indicating that the F-PNIPAM can remove almost all ethanol through absorption.

Example 3

F-PNIPAM with a desired volume was prepared by molding in cubical polydimethylsiloxane (PDMS) mold. Briefly, the PDMS mold was prepared by mixing the main component and the curing agent in 10:1 ratio by weight followed by degasification in vacuum oven to remove trapped air bubbles. The mixture was then poured in a cuboidal mold of 1.2 cm×1.2 cm base and heated at 60° C. for 6 hours for cross-linking. The PDMS mold replicated the shape of the mold with the dimensions mentioned above. Subsequently, 1 mL of the F-PNIPAM solution was poured in the PDMS mold and exposed to ultraviolet light (UV-A, λ=365 nm) for 15 minutes for photocuring. After photocuring, the cross-linked F-PNIPAM gel with 1.2 cm×1.2 cm×0.7 cm (about 1 cm³ volume) dimension was carefully removed from the mold.

All absorption experiments were performed using F-PNIPAM with 10 wt. % F-acrylate. The swelling ratio (S.R.) of F-PNIPAM was determined using Eqn. 6 from the weight of F-PNIPAM at time 't' (W), during preparation ($W_o$) and the weight of polymer in F-PNIPAM ($W_s$, equivalent to weight of dried F-PNIPAM). Similarly, the equilibrium swelling ratio would indicate the swelling ratio of F-PNIPAM at its maximum swelling state. The equilibrium swelling ratio (S.R.$_{eq}$) was obtained by submerging F-PNIPAM in the desired solvent for seven days.

$$S.R. = \frac{U}{W_s} = \frac{W - W_o}{W_s} \qquad (6)$$

Figure 17:
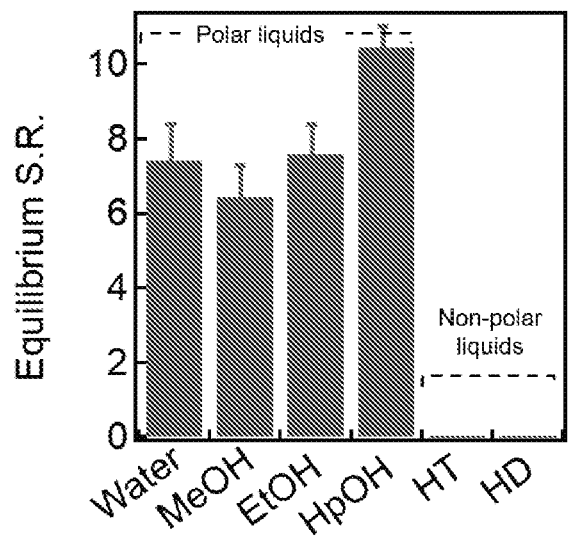
FIG. 17 is a plot showing equilibrium swelling ratio of F-PNIPAM in polar and non-polar solvents, wherein MeOH is methanol, EtOH is ethanol, HpOH is heptanol, HT is heptane, and HD is hexadecane.

FIG. 17 shows the equilibrium swelling ratio of the F-PNIPAM for various polar and non-polar liquids. All experiments were performed at room temperature (T=21° C.). F-PNIPAM can absorb up to 11 times the polymer weight when submerged in polar liquids. The equilibrium S.R. for water is around 7.42 and that for heptanol is 10.45. On the other hand, S.R. for non-polar liquids (hexadecane and heptane) are almost zero as F-PNIPAM barely absorbs them.

Figure 18:
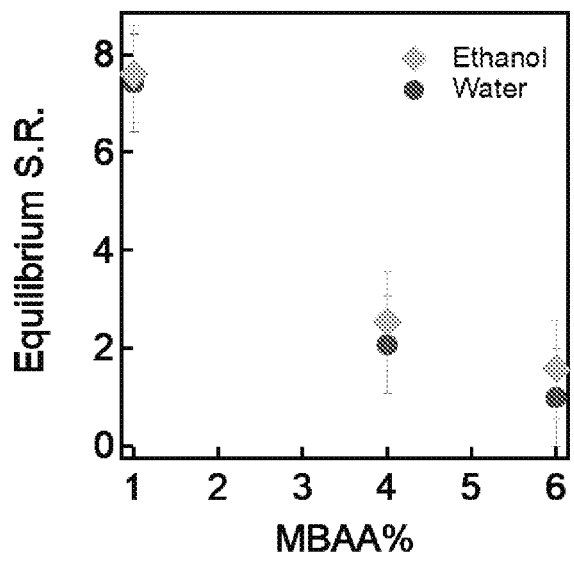
FIG. 18 is a plot showing equilibrium swelling ratio of F-PNIPAM as a function of MBAA composition.
Figure 19:
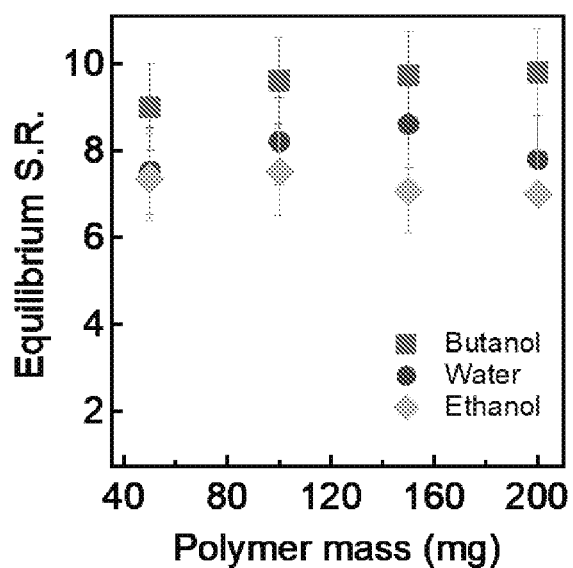
FIG. 19 is a plot showing equilibrium swelling ratio of F-PNIPAM as a function of polymer mass.

FIG. 18 shows the equilibrium swelling ratio of F-NIPAM for ethanol and water as a function of cross-linker concentration. It clearly shows that F-NIPAM absorbs less amount of liquids when the cross-linker concentration is increased. Absorption tests were also performed using F-PNIPAM with various polymer mass (FIG. 19). It was found that the equilibrium swelling ratio is almost the same for F-PNIPAM with different polymer mass.

Example 4

Figure 20:
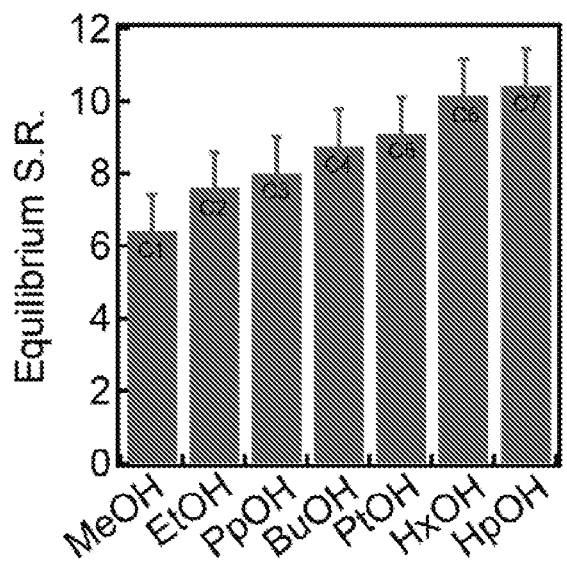
FIG. 20 is a plot showing equilibrium swelling ratio of F-PNIPAM for alcohols with various number of hydrocarbons, wherein MeOH is methanol, EtOH is ethanol, PpOH is propanol, BuOH is butanol, PtOH is pentanol, HxOH is hexanol, and HpOH is heptanol.

Interestingly, it was found that F-PNIPAM can absorb a larger amount of alcohols with increasing number of hydrocarbons in alcohols, as shown in FIG. 20. For example, the swelling ratio for methanol ($CH_3OH$) is about 6.43 while that for heptanol ($C_7H_{15}OH$) is 10.45. This may be explained using the Flory-Huggins polymer-solvent interaction parameter ($\chi$). The interaction parameter $\chi$ can be related to the Hansen solubility parameters (HSP) by Eqn. 7. The relation of $\chi$ and Hansen solubility parameters (HSP) is useful because HSP values for common liquid or polymers are extensively documented.

$$\chi = \alpha \frac{V}{RT}[(\delta_{D2} - \delta_{D1})^2 + 0.25(\delta_{P2} - \delta_{P1})^2 + 0.25(\delta_{H2} - \delta_{H1})^2] \qquad (7)$$

If HSP values are not known, they can be estimated by using the group contribution method by Hoftyzer and Van Krevelen (Eqn. 8). the Hansen solubility parameters of PNIPAM were estimated as $\delta_D$=19.15 $\sqrt{MPa}$, $\delta_P$=7.76 $\sqrt{MPa}$ and $\delta_H$=7.04 $\sqrt{MPa}$. The Hansen solubility parameters for F-acrylate from the group contribution method were also estimated. The estimated HSPs for F-acrylate are $\delta_D$=14.87 $\sqrt{MPa}$, $\delta_P$=2.74 $\sqrt{MPa}$ and $\delta_H$=3.97$\sqrt{MPa}$.

$$\delta_D = \frac{\Sigma F_{di}}{V}, \delta_P = \frac{\sqrt{\Sigma F_{pi}^2}}{V}, \delta_P = \sqrt{\frac{\Sigma E_{hi}}{V}} \qquad (8)$$

Figure 21:
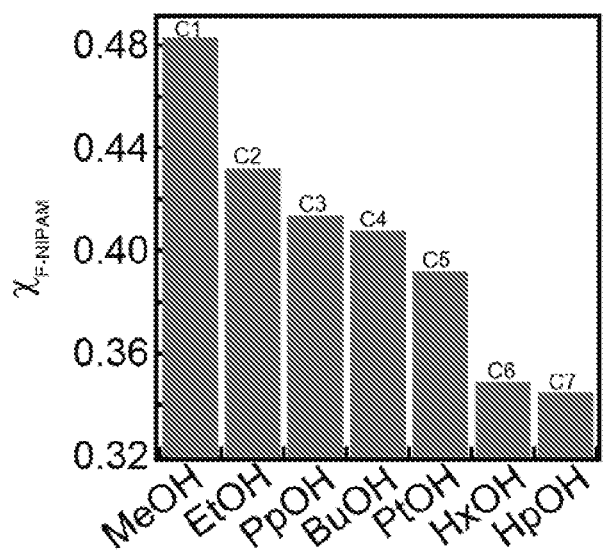
FIG. 21 is a plot showing x values of F-PNIPAM for alcohols with various numbers of hydrocarbons, wherein MeOH is methanol, EtOH is ethanol, PpOH is propanol, BuOH is butanol, PtOH is pentanol, HxOH is hexanol, and HpOH is heptanol.

Using the estimated Hansen solubility parameters, the $\chi$ values of NIPAM ($\chi_{NIPAM}$) with various alcohols can be calculated using Eqn. 7. The $\chi$ values of F-acrylate ($\chi_{F-acrylate}$) with various alcohols were also calculated. The $\chi$ values of F-PNIPAM ($\chi_{F-PNIPAM}$) were then calculated by considering F-acrylate a factor of 0.1 (i.e. $\chi_{F-PNIPAM}$=0.9 $\chi_{NIPAM}$+0.1 $\chi_{F-acrylate}$). These $\chi$ values for F-PNIPAM ($\chi_{F-PNIPAM}$) for various alcohols are shown in FIG. 21. It is worth noting that the correction factor $\alpha$ utilized in Eqn. 7 is 0.35 for all the calculations.

Example 5

Figure 28:
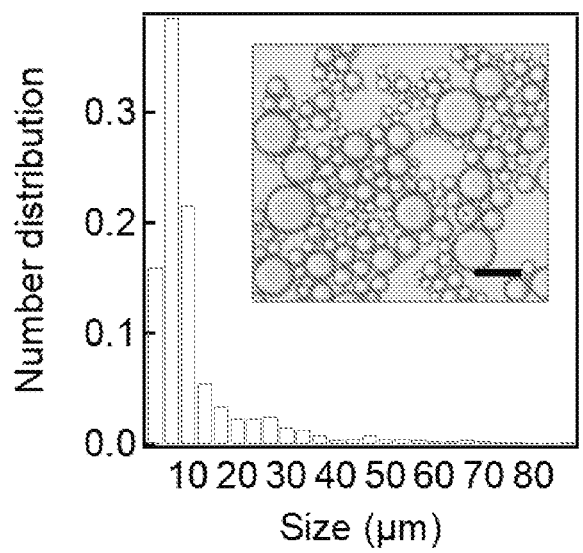
FIG. 28 is a plot showing size distribution of hexadecane in sodium dodecylsulfate (SDS) stabilized hexadecane-in-water (30:70 vol:vol) emulsion. The inset shows an optical microscope image of the emulsion; the bar represents 100 micrometers.
Figure 29:
FIG. 29 are photographs showing separation of hexadecane-in-water (30:70 vol:vol) emulsion. In (a) F-PNIPAM is submerged in the emulsion. (b) represents a time lapse of 15 minutes, showing the F-PNIPAM swollen with water from the emulsion. In (c), the F-PNIPAM is removed, and the remnant is almost pure hexadecane.
Figure 30:
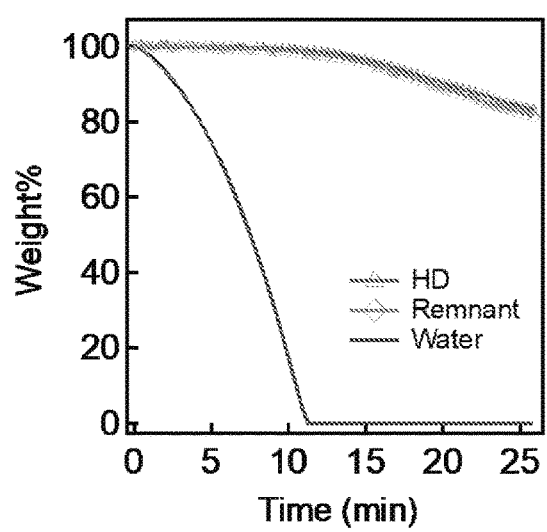
FIG. 30 is a TGA plot for the remnant after separation of hexadecane-in-water (30:70 vol:vol) emulsion.

A hexadecane-in-water emulsion (30:70, vol:vol) was prepared using sodium dodecyl sulfate (SDS) as a surfactant. SDS was dissolved in water such that the concentration is 10 mg/mL. Hexadecane was added to the SDS dissolved water such that the volume ratio of water and hexadecane is 70:30 followed by vigorous stirring for emulsification. A cube of F-PNIPAM (1 cm³) was submerged into 2 mL of hexadecane-in-water emulsion, as shown in FIG. 29. After 15 minutes, almost pure hexadecane was left indicating that almost all the water is absorbed by the F-PNIPAM cube. It was determined that the separation efficiency reached around 99% in 30 minutes. FIG. 30 shows the TGA plot for remnant after separation of hexadecane-in-water emulsion along with pure hexadecane and water. The separation efficiency for hexadecane-in-water emulsion is about 99%. FIG. 28 shows a plot of size distribution of hexadecane droplets in the emulsion.

Figure 31:
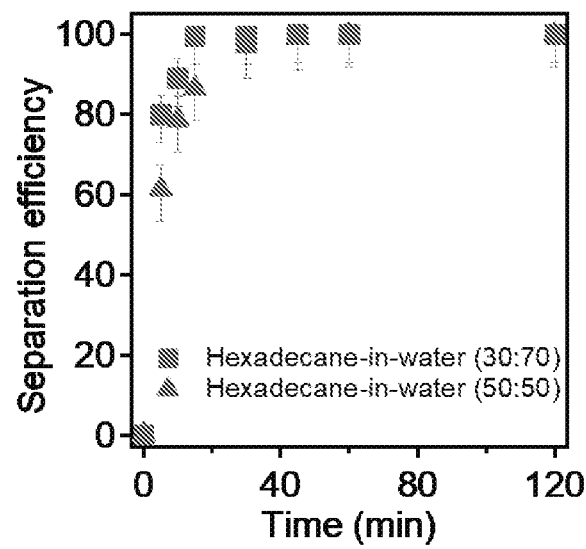
FIG. 31 is a plot showing separation efficiency of F-PNIPAM for hexadecane-in-water (30:70 vol:vol) emulsion as a function of time. Separation of efficiency for hexadecane of 50:50 vol:vol emulsion is also shown.

FIG. 31 shows the time-dependent separation efficiency of two different hexadecane-in-water emulsions with different oil composition (30% and 50 vol % of hexadecane). It was determined that an increase of hexadecane composition in the emulsions does not affect the final separation efficiency of the F-PNIPAM (about 99%). This can be attributed this to the F-PNIPAM's resistance to oil fouling. As the F-PNIPAM is oil-repellent yet water-loving, the F-PNIPAM can effectively repel oil while absorbing water. This can lead to a high separation efficiency even for the surfactant-stabilized oil-water emulsions. It is worth noting that separating 50:50 hexadecane-in-water emulsion is slower than 30:70 hexadecane in water emulsion, which can be attributed to the fact that the contact area of the F-PNIPAM and water is lowered due to the high concentration of oil phases.

Example 6

Figure 32:
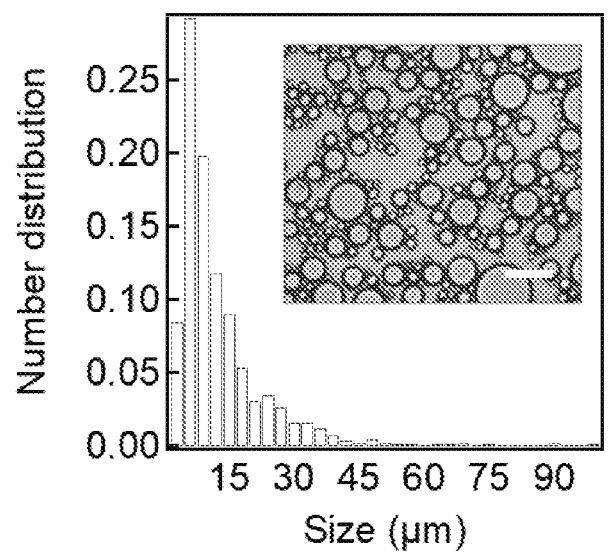
FIG. 32 is a plot showing size distribution of water in span80 stabilized water-in-hexadecane (50:50 vol:vol) emulsion. The insert is an optical microscope image of the emulsion, with the scale bar representing 100 micrometers.

A water-in-hexadecane emulsion (50:50, vol:vol) was prepared using span80 as a surfactant. Here, span80 was dissolved in hexadecane such that the concentration of span80 in hexadecane is 1 mg/mL. Water was added to this span80 dissolved hexadecane such that the ratio of water to hexadecane by volume is 50:50. The mixture was then vigorously stirred for 10 minutes to prepare the emulsion. FIG. 32 shows a plot of size distribution of water droplets in the emulsion.

Figure 33:
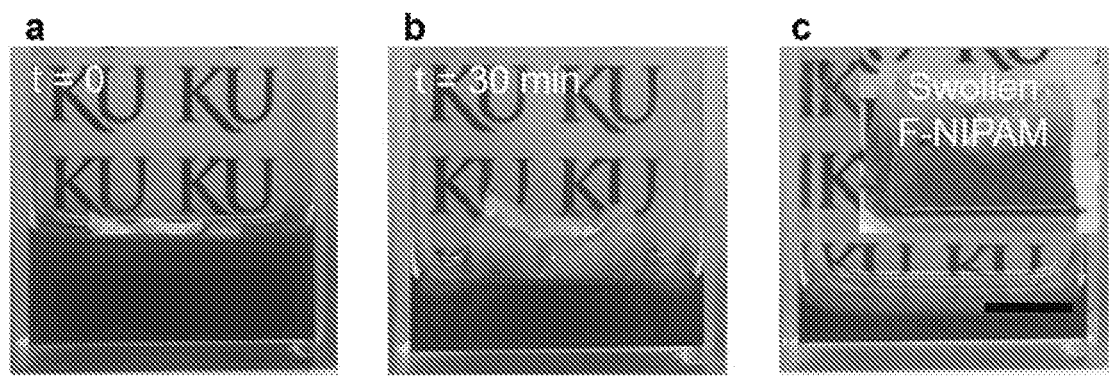
FIG. 33 are photographs showing separation of water-in-hexadecane (50:50 vol:vol) emulsion. In (a) F-PNIPAM is submerged in the emulsion. (b) represents a time lapse of 30 minutes, showing the F-PNIPAM swollen with water from the emulsion. In (c), the F-PNIPAM is removed, and the remnant is almost pure hexadecane.
Figure 34:
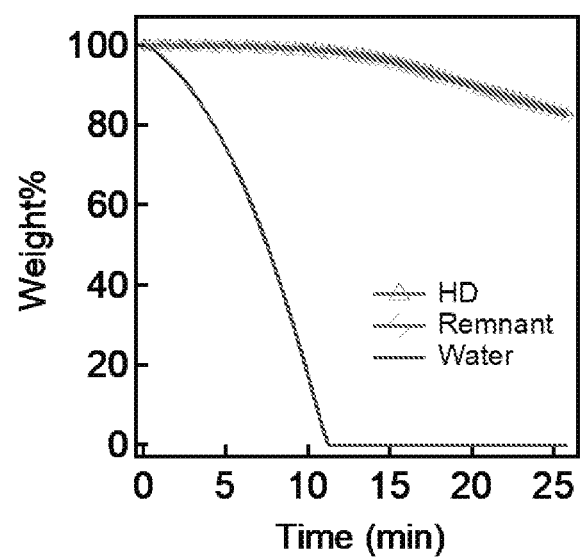
FIG. 34 is a TGA plot for the remnant after separation of water-in-hexadecane (50:50 vol:vol) emulsion.

FIG. 33 shows the separation of water-in-hexadecane emulsion (50:50, vol:vol) using the F-PNIPAM. A F-PNIPAM cube (3 cm$^3$) is submerged in hexadecane-in-oil emulsion (6 mL). After 30 minutes, only hexadecane was left in the container. The separation efficiency was determined using TGA. FIG. 34 shows the TGA plot for remnant after separation. Remnant after separation is almost the same as that of pure hexadecane. From the comparison, it can be determined that the separation efficiency for water-in-hexadecane emulsion is greater than 99%. The separation efficiency was also determined by comparing the density of remnant after separation. The density of the remnant is 0.772 g/cm$^3$. This is equivalent to hexadecane with less than 1 vol % water.

Figure 35:
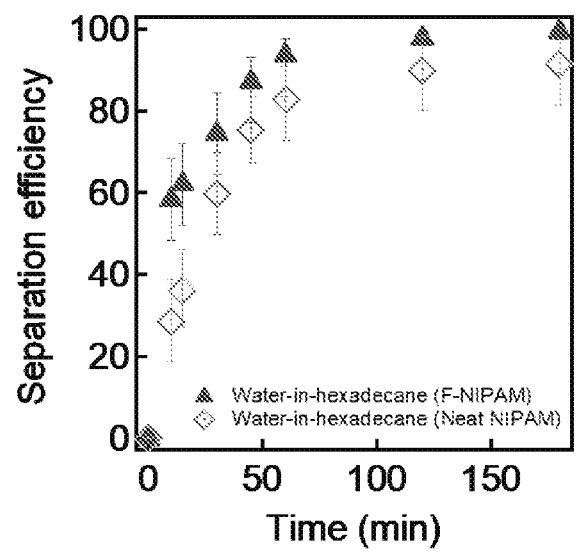
FIG. 35 is a plot showing separation efficiency of F-PNIPAM for water-in-hexadecane (50:50 vol:vol) emulsion as a function of time.

FIG. 35 shows a plot of time dependent separation efficiency for span80-stabilized water-in-hexadecane (50:50 vol:vol) emulsion. Unlike the F-PNIPAM, a neat NIPAM shows very slow separation for water-in-oil emulsions. This is because a neat NIPAM is easily fouled by oil which makes the water droplets difficult to be absorbed, as is described elsewhere herein.

Example 7

Figure 36:
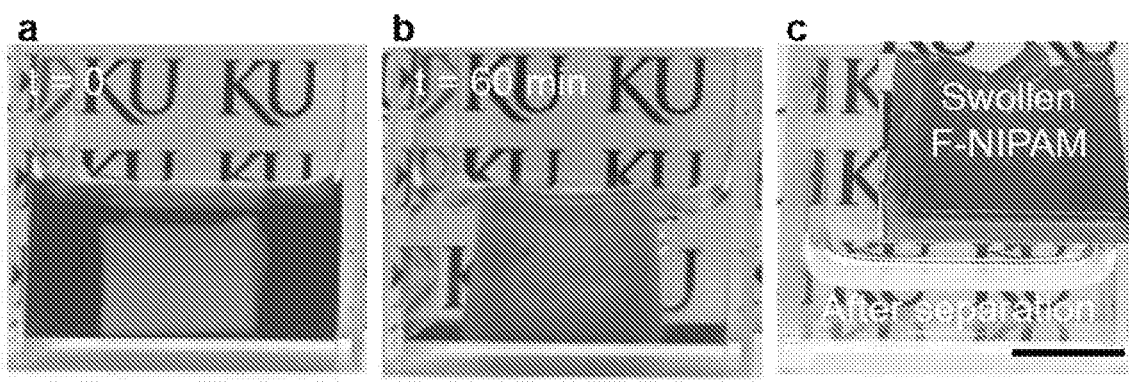
FIG. 36 shows a series of photographs showing separation of heptane-ethanol azeotrope using the F-PNIPAM. In photograph (a), F-PNIPAM (~3 cm$^3$) is submerged into the azeotrope. In (b), after 60 minutes, the F-PNIPAM has absorbed the ethanol. In (c), the F-PNIPAM is removed, leaving only the heptane.

The capability of the F-PNIPAM to separate miscible liquid mixtures was also tested. First, a miscible liquid mixture that consists of ethanol (polar) and heptane (non-polar) is separated. Heptane and ethanol are miscible in all ranges of compositions. Here, the heptane-ethanol azeotrope (54.5 vol % heptane and 45.5 vol % ethanol) was used to eliminate the evaporation effect during separation process. FIG. 36 shows the separation of the heptane-ethanol azeotrope (6 mL) using the F-PNIPAM cube ($\approx$3 cm$^3$). The F-PNIPAM selectively absorbs ethanol, as shown in FIG. 36B, leaving only heptane in the container (FIG. 36C).

Figure 37:
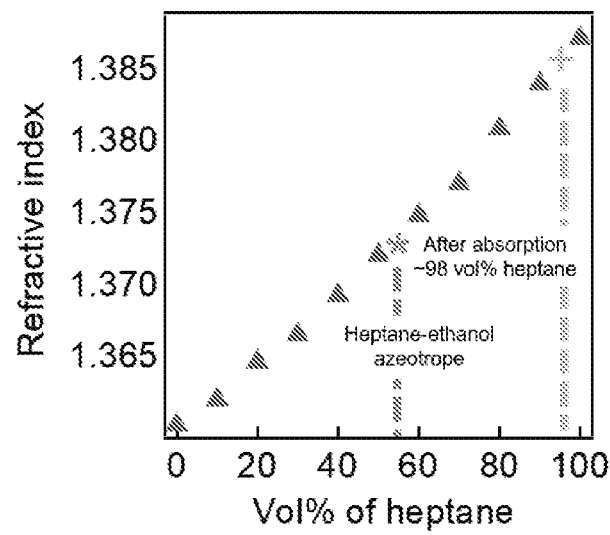
FIG. 37 is a plot showing a refractive index of the heptane-ethanol mixture as a function of volume percentage of heptane. The refractive index of heptane-ethanol azeotrope is shown both before and after separation.
Figure 38:
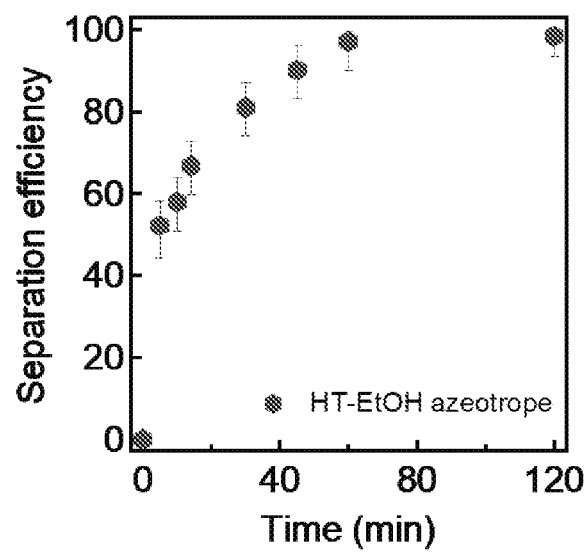
FIG. 38 is a plot showing separation efficiency for heptane-ethanol azeotrope as a function of submerged time.

FIG. 37 shows a plot of refractive index of heptane-ethanol mixture as a function of vol % of heptane. The refractive index of the remnant after separation was 1.3864 ($\approx$98 vol % heptane). The volume change of heptane is negligible, while the F-PNIPAM absorbs about 2.67 mL of ethanol. The results indicate that the F-PNIPAM can selectively absorb ethanol from heptane-ethanol mixture. FIG. 38 shows the heptane-ethanol azeotrope separation efficiency as a function of submerged time.

Figure 39:
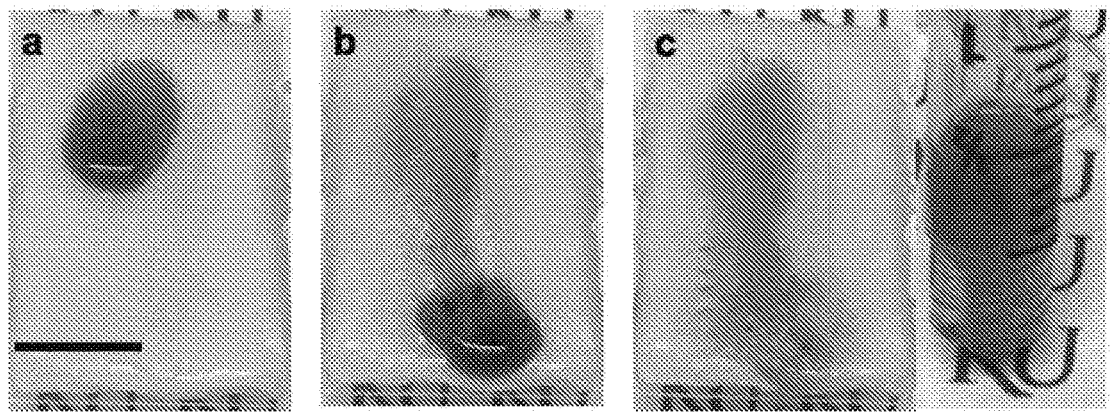
FIG. 39 shows a series of images showing selective absorption of ethanol while heptane-ethanol azeotrope slides along the surface of F-PNIPAM. In (a), the drop begins to slide along the F-PNIPAM surface. In (b), the ethanol is absorbed, while the azeotrope slides, as indicated by the change in the color of the F-PNIPAM surface. In (c), the sliding is completed, and the heptane is collected.

FIG. 39 shows sequential images of a droplet of heptane-ethanol azeotrope sliding along the F-PNIPAM surface. As ethanol is selectively absorbed by the F-PNIPAM, the surface of F-PNIPAM is discolored (by the coloring of the ethanol), while the droplet becomes heptane rich. Eventually, it is possible to collect almost pure heptane after the droplet completes sliding along the surface.

Example 8

Figure 40:
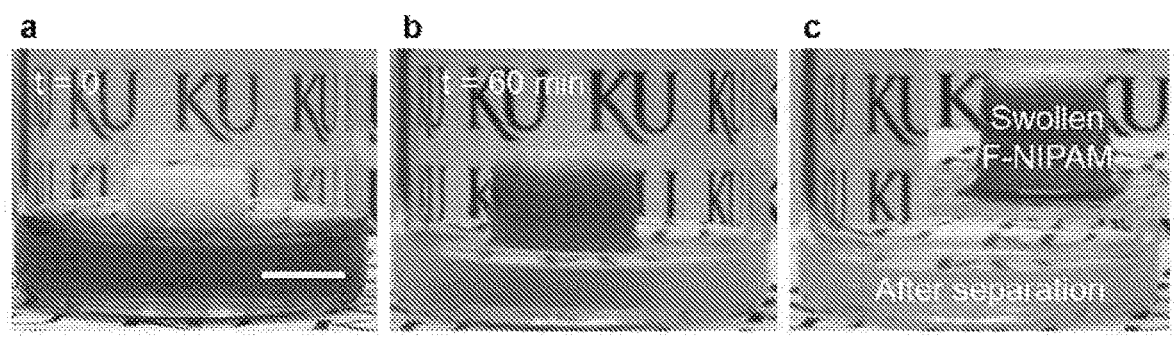
FIG. 40 is a series of photographs showing the separation of methanol and methyl oleate (30:70 vol:vol). In photograph (a), F-PNIPAM (~3 cm$^3$) is submerged into the mixture. In (b), after 60 minutes, the F-PNIPAM has absorbed the methanol. In (c), the F-PNIPAM is removed, leaving only the methyl oleate.
Figure 41:
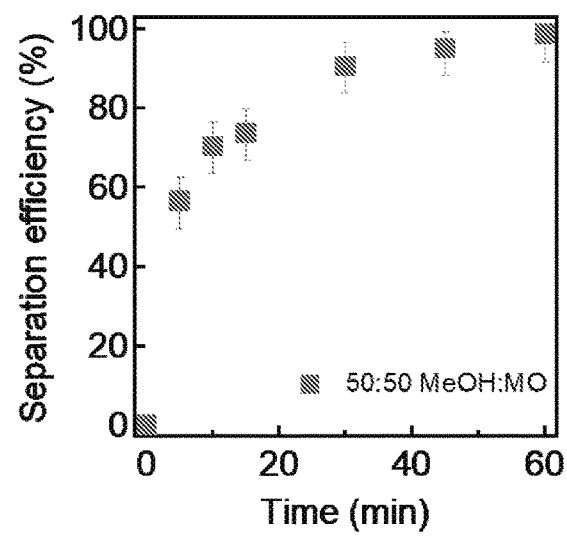
FIG. 41 is a plot showing separation efficiency for methanol-methyl oleate mixture as a function of time.

The separation of miscible methanol (MeOH) and methyl oleate (MO) was studied. FIG. 40 shows the separation of the miscible MeOH-MO mixture (30:70 vol:vol) using a F-PNIPAM cube (1 cm$^3$). Once the F-PNIPAM is submerged in the MeOH-MO mixture (FIG. 40A), it selectively absorbs methanol while repelling methyl oleate (FIG. 40B). After separation, the F-PNIPAM absorbs the methanol and almost pure methyl oleate is left (FIG. 40C). FIG. 41 shows a plot of separation efficiency for MeOH-MO mixture (30:70 vol:vol) as a function of submerging time. The separation efficiency reaches about 98% within 60 minutes.

Example 9

Figure 42:
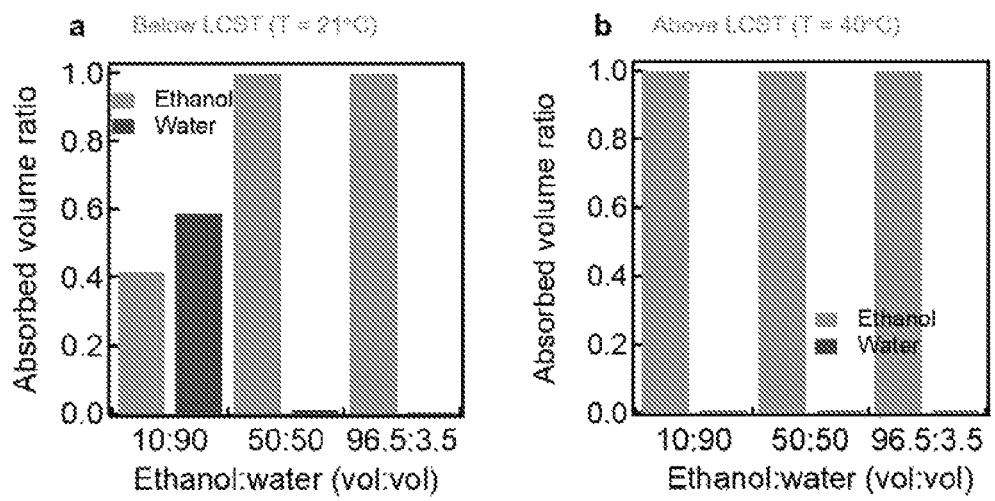
FIG. 42A is a bar graph showing the volume ratio of liquid absorbed by F-PNIPAM as a function of the ethanol:water (vol:vol) ratio below LCST (T=21° C.). 96.5:3.5 corresponds to the composition of ethanol-water azeotrope. For each concentration, the bar on the left represents ethanol, while the bar on the right represents water.
FIG. 42B is a bar graph showing the volume ratio of liquid absorbed by F-PNIPAM as a function of the ethanol:water (vol:vol) ratio above LCST (T=40° C.). 96.5:3.5 corresponds to the composition of ethanol-water azeotrope. For each concentration, the bar on the left represents ethanol, while the bar on the right represents water.

FIGS. 42A and B are plots of the volume ratio of the absorbed liquid at temperature below LCST (T=21° C.) and above LCST (T=40° C.), respectively. Here, various concentrations of ethanol-water mixture including 10:90, 50:50 and 96.5:3.5 (ethanol:water (vol:vol)). In the graphs, the bar on the left represents ethanol, while the bar on the right represents water. Of note, the composition 96.5:3.5 (ethanol:water (vol:vol)) is the azeotrope of ethanol-water mixture. When the temperature is below LCST, the volume ratio of ethanol in the absorbed liquid is significantly higher than the initial ethanol composition in the feed mixture. For example, the volume fraction of ethanol in the absorbed liquid is 99.59 vol % although the initial ethanol composition is 50 vol %. This is attributed to to $\chi_{EtOH} < \chi_{water}$ ($\chi_{EtOH}=0.43$ and $\chi_{water}=0.45$). Because $\chi_{EtOH} < \chi_{water}$, F-PNIPAM absorbs higher volume of ethanol from the ethanol-water mixture. Moreover, when the temperature is above LCST, F-PNIPAM absorbed only ethanol while repelling water. The table below shows the volumes of ethanol and water absorbed by the F-PNIPAM below and above LCST for various ethanol:water ratios. Negative numbers indicate release of the Oven liquid.

| | Ethanol:water (vol:vol) | 10:90 | 50:50 | 96.5:3.5 (Azeotrope) |
|---|---|---|---|---|
| Below LCST (T = 21° C.) | Water absorbed (μL) | 41 | 3 | −360 |
| | Ethanol absorbed (μL) | 29 | 730 | 1,920 |
| Above LCST (T = 40° C.) | Water absorbed (μL) | −194 | −183 | −330 |
| | Ethanol absorbed (μL) | 29 | 785 | 1,840 |

Example 10

Figure 43:
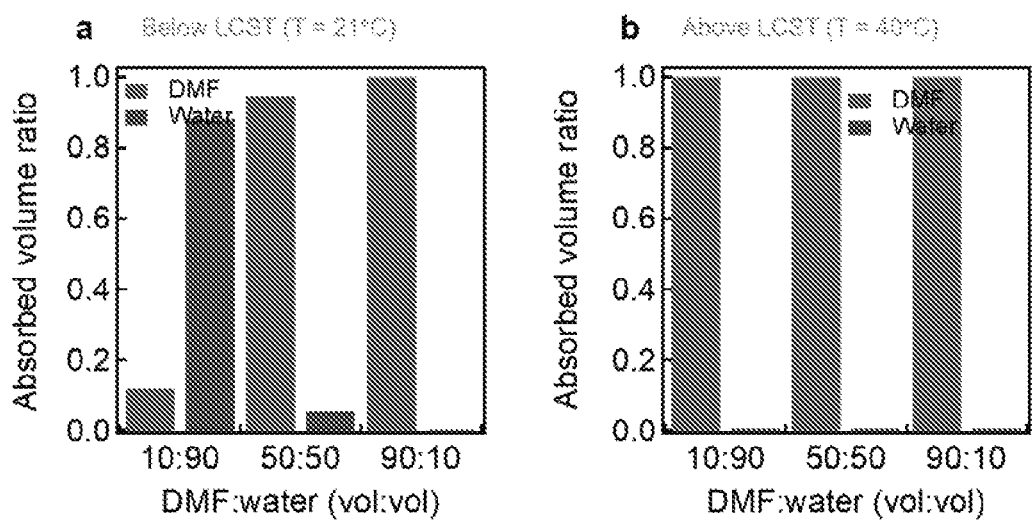
FIG. 43A is a bar graph showing the volume ratio of liquid absorbed by F-PNIPAM as a function of the DMF:water (vol:vol) ratio below LCST (T=21° C.). For each concentration, the bar on the left represents dimethylformamide (DMF), while the bar on the right represents water.
FIG. 43B is a bar graph showing the volume ratio of liquid absorbed by F-PNIPAM as a function of the DMF:water (vol:vol) ratio above LCST (T=40° C.). For each concentration, the bar on the left represents DMF, while the bar on the right represents water.

The F-PNIPAM was also used to separate a polar-polar liquid mixture consisting of dimethylformamide (DMF) and water. The $\chi$ value of the F-PNIPAM with DMF was determined to be 0.22. Since $\chi_{DMF} < \chi_{water}$ ($\chi_{water}=0.45$), it is expected that the F-PNIPAM can absorb a larger amount of DMF than water. FIGS. 43A and 43B are plots of the volume ratio of the absorbed liquid at a temperature below LCST (T=21° C.) and above LCST (T=40° C.), respectively. The table below shows the volume of DMF and water absorbed by F-NIPAM below and above LCST.

|  |  | DMF:water (vol:vol) | 10:90 | 50:50 | 90:10 |
|---|---|---|---|---|---|
| Below LCST (T = 21° C.) | Water absorbed (μL) | | 670 | 35 | −500 |
| | DMF absorbed (μL) | | 90 | 608 | 1,663 |
| Above LCST (T = 40° C.) | Water absorbed (μL) | | −100 | −209 | −673 |
| | DMF absorbed (μL) | | 91 | 605 | 1,979 |

Absorption Kinetics

Figure 22:
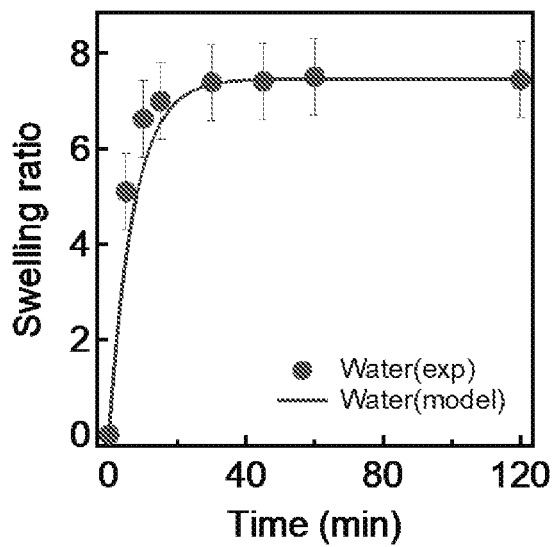
FIG. 22 is a plot showing the swelling ratio of F-NIPAM in water as a function of time.
Figure 23:
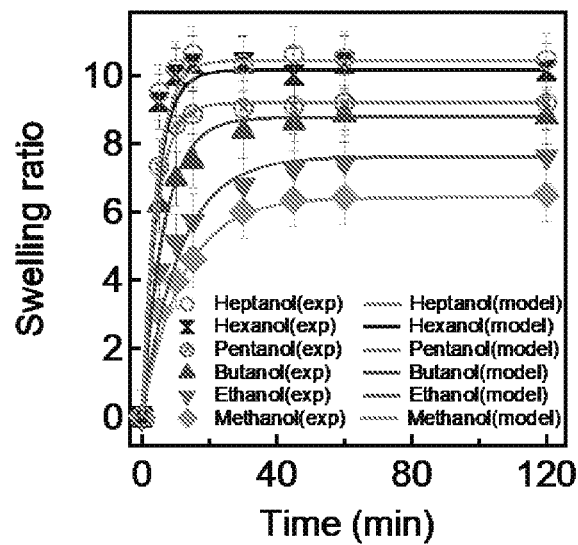
FIG. 23 is a plot showing swelling ratio (S.R.) of F-PNIPAM in alcohols with different number of hydrocarbons as a function of time.

To study the kinetics of absorption, the F-PNIPAM was submerged in the desired liquid and the weight change was recorded at intervals. FIG. 22 shows a plot of the swilling ratio of the F-PNIPAM in water as a function of submerging time. The absorption behavior can be explained with the first order kinetics. Here, the S.R. at a given time (t) is given by S.R.=S.R.$_{eq}$ (1−e$^{-k_s t}$) where S.R.$_{eq}$ is the equilibrium swelling ratio and $k_s$ is the swelling rate constant. The rate constant for water is found to be 0.0023 sec$^{-1}$. FIG. 23 shows the plots of S.R. values for various alcohols as a function of submerging time. The $k_s$ are found as 0.0014 sec$^{-1}$, 0.0015 sec$^{-1}$, 0.0025 sec$^{-1}$, 0.0040 sec$^{-1}$, 0.0040 sec$^{-1}$, and 0.0040 sec$^{-1}$ for methanol, ethanol, butanol, pentanol, hexanol and heptanol, respectively.

Recovery Experiments

Example 11

It was previously described that the F-PNIPAM can selectively absorb polar liquid (water) from a non-polar liquid (hexadecane, oil). Releasing the absorbed water from F-PNIPAM is critical to recover the water and to recycle the F-PNIPAM for further separation operation.

One of the simplest methods to release water from hydrogel is heat treatment. PNIPAM releases water at a temperature above its LCST, discussed further below. Although heat treatment is effective to release and recover water, it is highly energy-intensive. Mechanical compression has been utilized to squeeze water from hydrogel. However, this method can also be limited by damaging or sometimes disintegrating hydrogel. These challenges associated to the current thermal and mechanical treatments may be overcome by utilizing thermodynamic approaches. Two different techniques were tested to release water from F-PNIPAM. One is so-called co-nonsolvency and the other is osmosis.

Figure 44:
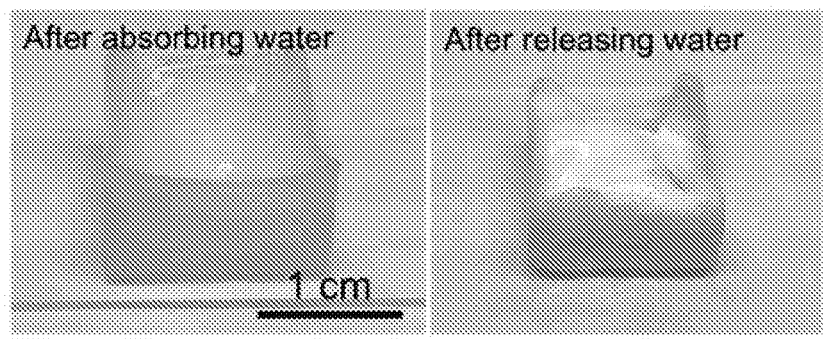
FIG. 44 is a photograph of F-PNIPAM after absorbing water, and after releasing water.

Co-nonsolvency refers to a finding that hydrogel can release containing liquid when it is submerged in a solution of two or more liquids. For example, PNIPAM releases water when it is submerged in an ethanol-water mixture having a certain composition. A solution of ethanol and water (1:1) was used to test releasing water of the F-PNIPAM. To test the release of water of the F-PNIPAM, it was introduced to a water bath for 1 hour. The F-PNIPAM swelled and absorbed about 1,473 mg. Subsequently, the F-PNIPAM was transferred into a 15 mL of ethanol-water (1:1) solution bath. After 1 hour, the F-PNIPAM had released 1,234 mg of water. This value corresponds to about 83.8% of that water which was absorbed. FIG. 44 shows photographs of the F-PNIPAM after absorbing water and releasing 91% of water after being submerged in ethanol-water (1:1) solution.

In another embodiment, osmosis (or osmotic pressure)-driven methods were used for releasing water from hydrogel. Here, a sodium chloride aqueous solution (NaCl, 300 mg/mL) was used to release water from F-PNIPAM. The F-PNIPAM containing 1,200 mg of water is submerged in NaCl solution for 1 hour. 870 mg of water was released, which corresponds to about 71.8% of that which was absorbed.

Example 12

A combined approach—e.g., submerging the F-PNIPAM in a 1:1 ethanol:water solution containing NaCl—may result in an enhanced release. Therefore a test was conducted using 1:1 ethanol:water solution containing 30 mg/mL of NaCl. Surprisingly, it was observed that the F-PNIPAM lost about 93.3% of water in 1 hour, which indicates that almost all water is released. The table below summarizes the experimental data representing the releasing of the absorbed water from F-PNIPAM using different solutions.

| Recovery solution | A. Absorbed water (mg) | B. Released water after 30 min (mg) | C. Released water after 1 hour (mg) | % recovery (=C/A × 100) |
|---|---|---|---|---|
| NaCl (aq) | 1,200 | 861 | 870 | 71.8% |
| 1:1 Ethanol:Water | 1,473 | 1,087 | 1,234 | 83.8% |
| 1:1 Ethanol:Water with NaCl | 1,469 | 1,216 | 1,371 | 93.3% |

For comparison, the same recovery tests of a neat PNIPAM were also conducted. The table below summarizes the results.

| Recovery solution | A. Absorbed water (mg) | B. Released water after 30 min (mg) | C. Released water after 1 hour (mg) | % recovery (=C/A × 100) |
|---|---|---|---|---|
| NaCl (aq) | 1,059 | 519 | 515 | 48.6% |
| 1:1 Ethanol:Water | 1,430 | 1,019 | 1,126 | 78.7% |
| 1:1 Ethanol:Water with NaCl | 1,139 | 996 | 1,029 | 90.3% |

As discussed in greater detail above, the F-PNIPAM can also selectively absorb ethanol from a completely miscible mixture with a non-polar liquid (heptane). The same solutions discussed above were used to recover ethanol from the F-PNIPAM. The table below summarizes the results.

| Recovery solution | A. Absorbed ethanol (mg) | B. Released ethanol after 30 min (mg) | C. Released ethanol after 1 hour (mg) | % recovery (=C/A × 100) |
|---|---|---|---|---|
| NaCl (aq) | 1,580 | 285 | 305 | 19.3% |
| 1:1 Ethanol:Water | 1,440 | 207 | 157 | 10.9% |
| 1:1 Ethanol:Water with NaCl | 1,460 | 252 | 329 | 22.5% |

For comparison, the same recovery tests of a neat PNIPAM were also conducted, and the table below summarizes the results.

| Recovery solution | A. Absorbed ethanol (mg) | B. Released ethanol after 30 min (mg) | C. Released ethanol after 1 hour (mg) | % recovery (=C/A × 100) |
|---|---|---|---|---|
| NaCl (aq) | 1,010 | 195 | 217 | 21.5% |
| 1:1 Ethanol:Water | 1,332 | 187 | 270 | 20.3% |
| 1:1 Ethanol:Water with NaCl | 1,171 | 219 | 201 | 17.2% |

Figure 45:
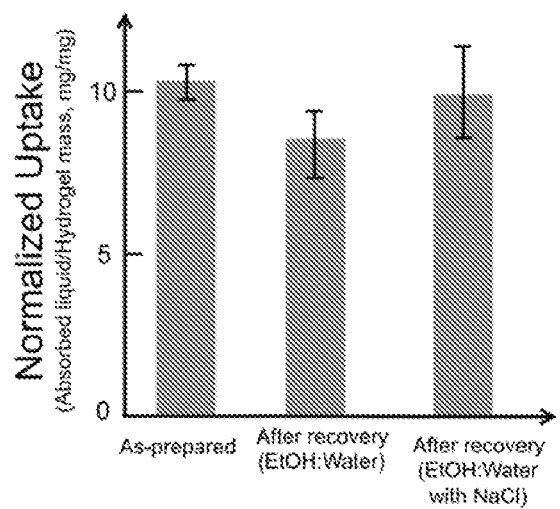
FIG. 45 is a graph showing normalized water uptake of F-PNIPAM after recovery processes.
Figure 46:
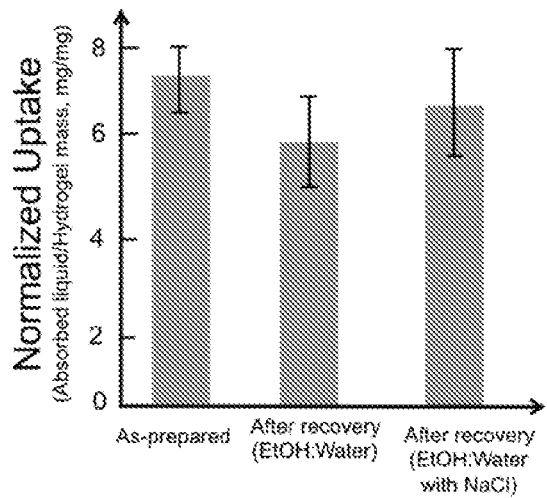
FIG. 46 is a graph showing normalized ethanol uptake of F-PNIPAM after recovery processes.

The recyclability of the F-PNIPAM was observed after releasing water by submerging it in a water bath for 1 hour and comparing the amount of absorbed water with that obtained using an as-prepared F-PNIPAM, as described above. FIG. 45 shows that the F-PNIPAM after releasing water can absorb almost the same amount of water, which indicates that the F-PNIPAM can be repeatedly used in the separation of liquid mixtures. FIG. 46 shows that the F-PNIPAM after releasing ethanol can also absorb almost same amount of ethanol.

Example 13

Figure 47:
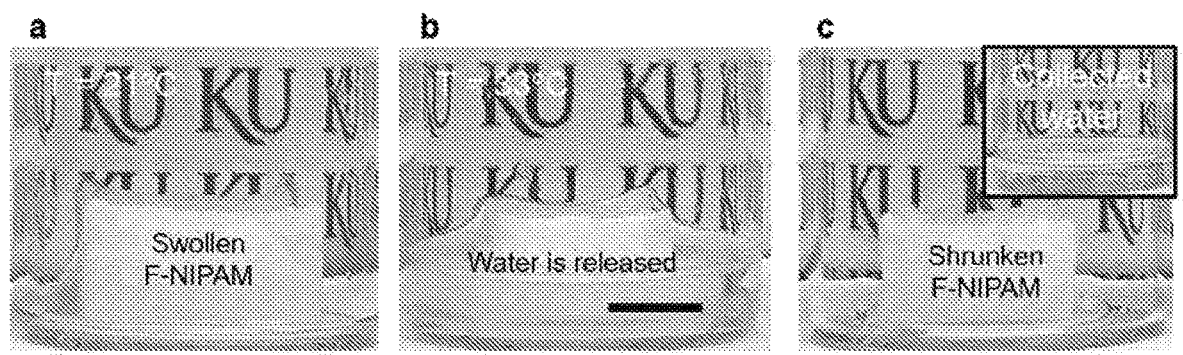
FIG. 47 is a series of photographs showing the release of water from F-PNIPAM with mild heat applications (T=33° C.). In (a), the F-PNIPAM is swollen to equilibrium by absorbing water at T=21° C. In (b), the F-PNIPAM released 82% of absorbed water at the heat application temperature. Finally, in (c), the F-PNIPAM is shrunken to about its as-prepared state.

Due to the thermo-responsive behavior of NIPAM, the F-PNIPAM can release absorbed liquid (water) at a temperature above the LCST. It should be emphasized that the LCST for the F-PNIPAM was found to be about 28° C. This allows for water release at a mild heat treatment. FIG. 47 shows the recovery of water at T=33° C. It was determined that F-PNIPAM can release 1,150 mg of water. This is equivalent to the recovery of about 82% of the absorbed water. It is worth noting that the LCST of NIPAM can be controlled by copolymerizing with other polymers. For example, adding a low surface energy material such as F-acrylate considered in this study can lower the LCST.

Example 14

Salt ions may induce deswelling of NIPAM and consequently, the release of absorbed liquid. Anions contribute to the deswelling process. First, anions can polarize the water molecules that hydrogen bond to the amide groups. This results in the weakened hydrogen bond. In addition, anions disrupt the hydrophobic hydration of water molecules to the isopropyl groups.

Figure 48:
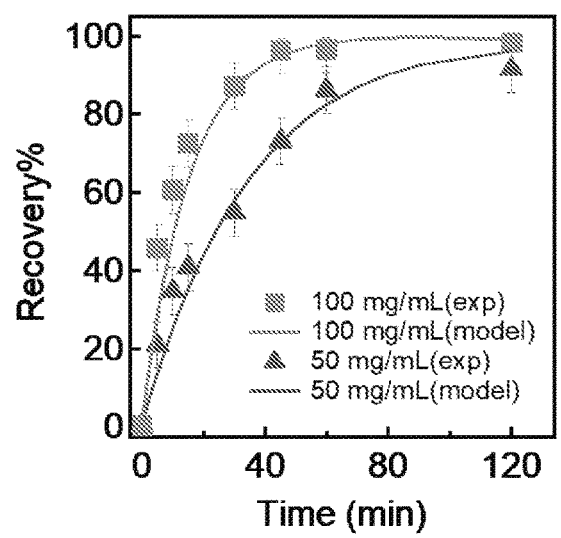
FIG. 48 is a plot showing water recover from F-PNIPAM as a function of time in various concentration of aqueous NaCl solution.

Sodium chloride (NaCl) was found to effectively induce deswelling of the F-PNIPAM and consequently releasing the absorbed liquid. FIG. 48 shows a plot of % water recovery of the F-PNIPAM submerged in aqueous NaCl solution. Here two different concentrations (50 mg/mL and 100 mg/mL) of NaCl were used. About 98% of the absorbed water can be recovered by submerging the F-PNIPAM in NaCl solution for 120 minutes. The recovery of water using aqueous salt solution follows the first order kinetics given as Recovery %=$(1-e^{-k_r t}) \times 100$. Here, $k_r$ is the recovery rate at a given time (t). The first order kinetic model matches well with the experimental data with $k_r$=0.0048 and $k_r$=0.0011 for 50 mg/mL and 100 mg/mL, respectively.

Figure 49:
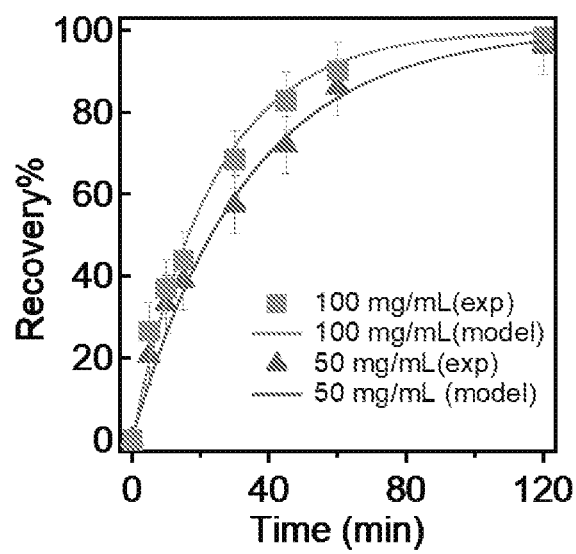
FIG. 49 is a plot showing ethanol recovery from F-PNIPAM as a function of time in various concentrations of aqueous NaCl solution.

It was also demonstrated that ethanol can be released using an aqueous NaCl solution. FIG. 49 shows a plot of the percentage of ethanol recovery for the F-PNIPAM submerged in aqueous NaCl solutions with two different concentrations (50 mg/mL and 100 mg/mL). Again, about 98% of ethanol can be recovered. The first order kinetics model describes well the experimental data with $k_r$=0.0005 for 50 mg/mL and $k_r$=0.0007 for 100 mg/mL.

Fouling of Neat NIPAM

Hydrophilic yet oleophobic materials have been used in separation of liquid mixtures consisting of polar (such as water) and non-polar (such as oil) phases. For example, hydrophilic/oleophobic membranes can selectively allow water to wet the surface and permeate through while repelling oil. Similarly, it has been demonstrated that the F-PNIPAM as described herein can be preferentially wet by water while repelling oil at temperatures below the LCST. Specifically, it was demonstrated that a water droplet can undercut the oil and consequently wet the surface. Such self-cleaning ability is critical to mitigate surface fouling.

Figure 50:
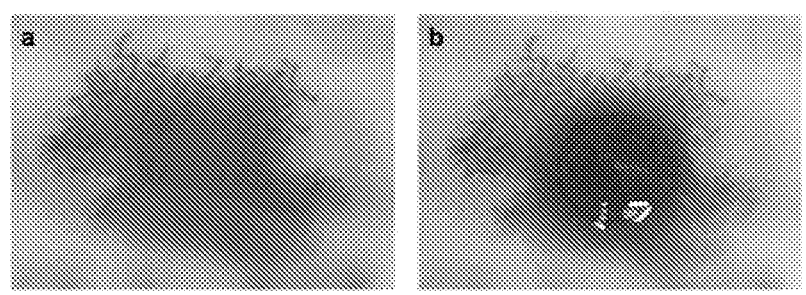
FIG. 50 shows a series of photographs showing oil fouling on the surface of hydrophilic/oleophilic neat NIPAM. In (a), the NIPAM is fouled by hexadecane. In (b), the oil fouling hinders the ability of water (the darker colored spot) to wet the surface.

By contrast, FIG. 50 shows a neat NIPAM (without F-acrylate) that is fouled by oil. Here, an oil droplet (hexadecane, dyed red) with surfactant (span80, 5 mg/mL) can easily spread on the surface. When a water droplet (dyed blue) comes in contact, oil hinders the water from wetting the surface and being absorbed. Therefore, it is difficult to clean the oil fouled NIPAM surface by applying water.

Apparatus for Separation and In-Situ Recovery of Absorbed Liquid Using F-PNIPAM

According to another embodiment of the invention, an apparatus was developed for separating and recovering absorbed liquid from the F-PNIPAM. In order to achieve the continuous separation and simultaneous release of the absorbed liquid, the F-PNIPAM needs to contact a liquid mixture to selectively absorb one phase over the other while contacting the salt aqueous solution to release the absorbed liquid.

Figure 51:
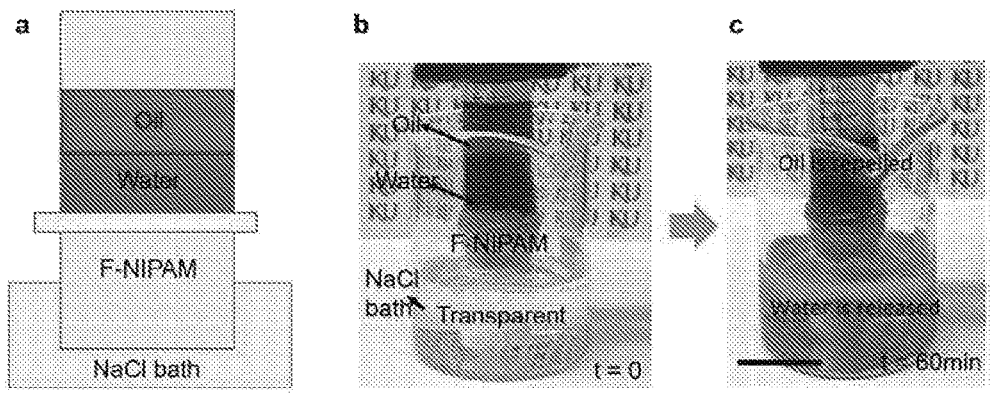
FIG. 51A is a schematic illustrating an apparatus for separating an oil-water mixture according to an embodiment of the invention.
FIGS. 51B and C are photographs showing the continuous separation of an oil-water mixture utilizing the apparatus of FIG. 51A.

Referring now to FIG. 51, the apparatus for continuous separation of oil-water mixtures and the simultaneous recovery of the absorbed water includes a first container for holding a salt solution (e.g., a solution of NaCl), and a second container for holding the F-PNIPAM and the mixture to be separated. The F-PNIPAM is situated in the second container such that it is in continuous contact with the NaCl solution, as shown in FIG. 51A. Upon application of the oil-water mixture on top of the F-PNIPAM, water from the mixture is continuously absorbed by the F-PNIPAM, and at the same time, the absorbed water is released to the NaCl aqueous solution bath, while the oil is repelled. Utilizing this apparatus, the continuous oil-water separation is illustrated in FIGS. 51B and 51C. Here, the water was dyed blue, and the oil was dyed red. The release of the absorbed water can be verified by the color change in the NaCl solution bath from clear to blue, while the red oil remains in the second container atop the F-PNIPAM.

Figure 52:
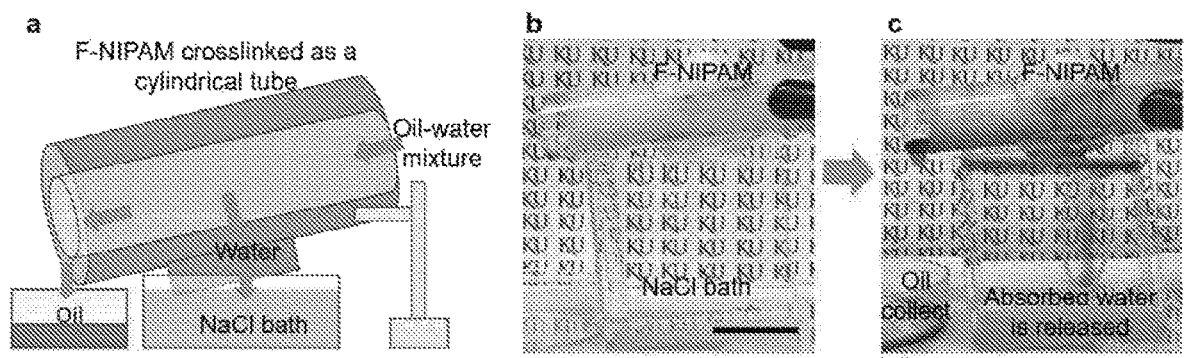
FIG. 52A is a schematic illustrating a separation apparatus for separating an oil-water mixture according to another embodiment of the invention.
FIGS. 52B and C are photographs showing the continuous separation of an oil-water mixture utilizing the apparatus of FIG. 52A.

FIG. 52 illustrates another embodiment of an apparatus for separating a flowing oil-water mixture. Here, as shown in FIG. 52A, the F-PNIPAM is crosslinked as a cylindrical hollowed tube such that it can contact the salt solution (here, an aqueous NaCl bath). The oil-water mixture flows through the F-PNIPAM tube, and only water is absorbed by the F-PNIPAM while the oil slides off the surface and is collected at the end of the tube. At the same time, the absorbed water will be released into the NaCl bath underneath the F-PNIPAM. FIGS. 52B and 52C show the continuous separation of oil-water mixture. The F-PNIPAM tube may be inclined slightly to allow the introduced oil-water mixture to slide through the hollow F-PNIPAM. Here water was dyed blue whereas oil was dyed red. As the NaCl bath was initially colorless, the release of the absorbed water (dyed blue) can be clearly observed by the change of color of the NaCl bath.

Thus has been described a new hydrogel, F-PNIPAM, and methods of making same, and apparatus for separating absorbed liquids from the hydrogel, which have superior qualities when compared to prior art hydrogels. While specific examples are provided herein in describing the invention, it shall be understood that the example are only for the purpose of describing the invention, and are not intended to be limiting. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations.

The invention claimed is:

1. A hydrogel for separation of polar-non-polar liquid mixtures, the hydrogel comprising a copolymer consisting of N-isopropylacrylamide and
   1H, 1H,2H,2H-perfluorodecyl acrylate, crosslinked by N,N' Methylenebisacrylamide (MBAA);
   wherein the copolymer has the following chemical structure:

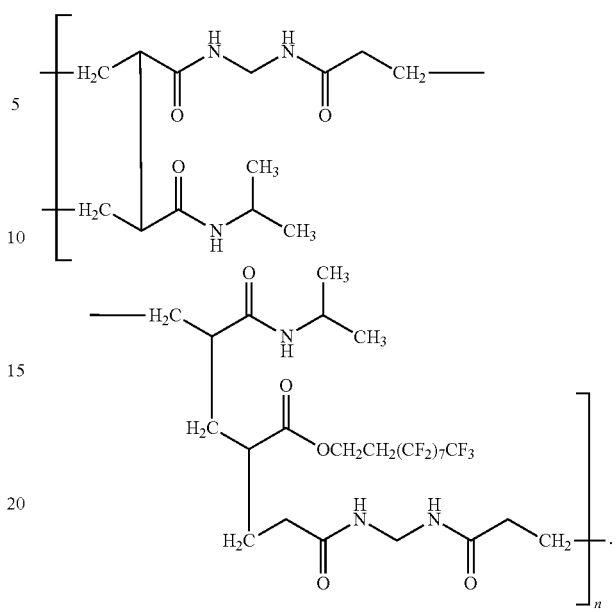

wherein the weight percent of MBAA crosslinking the N-isopropylacrylamide and the 1H,1H,2H,2H-perfluorodecyl acrylate in the hydrogel is between about 0.4 and 0.6%.

2. A method for synthesizing the hydrogel of claim 1, comprising the steps of:
   (a) dissolving 2-hydroxy-2-methylpropiophenone, the N-isopropylacrylamide, and the N,N' Methylenebisacrylamide (MBAA) in deionized water to form a NIPAM solution;
   (b) preparing a solution of the 1H, 1H,2H,2H-Perfluorodecyl acrylate in ethanol;
   (c) separately stirring the solutions prepared in steps (a) and (b) for approximately three hours;
   (d) gradually introducing the solution from step (b) into the solution from step (a);
   (e) stirring the resulting solution from step (d) for about two hours;
   (f) pouring the resulting solution from step (e) into a mold and irradiating with UV-A for about 15 minutes.

3. The method of claim 2, wherein the weight ratio of the N-isopropylacrylamide, N,N' Methylenebisacrylamide, and 2-hydroxy-2-methylpropiophenone is 97:1:2.

4. The method of claim 3, wherein the concentration of the 2-hydroxy-2-methylpropiophenone, the N-isopropylacrylamide, and the MBAA in the solution in step (a) is 200 mg/ml.

5. The method of claim 4, wherein the concentration of the 1H,1H,2H,2H-Perfluorodecyl acrylate in the solution in step (b) is 200 mg/ml.

6. The method of claim 5, wherein the weight ratio of 1H, 1H,2H,2H-Perfluorodecyl acrylate to the N-isopropylacrylamide in step (d) is 9:1.

7. A hydrogel made by a process comprising the steps of:
   (a) forming a NIPAM solution consisting of N-isopropylacrylamide, N,N' Methylenebisacrylamide (MBAA), and 2-hydroxy-2-methylpropiophenone dissolved in deionized water;
   (b) preparing a solution consisting of 1H, 1H,2H,2H-Perfluorodecyl acrylate in ethanol;

(c) separately stirring the solutions prepared in steps (a) and (b) for approximately three hours;
(d) preparing a F-PNIPAM solution consisting of the solutions of steps (a) and (b) by introducing the solution from step (b) into the solution from step (a) and stirring for about two hours; and
(e) pouring the F-PNIPAM solution from step (d) into a mold and irradiating the poured F-PNIPAM solution with UV-A for about 15 minutes;
wherein the weight percent of MBAA crosslinking the N-isopropylacrylamide and the 1H, 1H,2H,2H-Perfluorodecyl acrylate in the hydrogel is between about 0.4 and 0.6% and the hydrogel is effective to selectively absorb a polar liquid from a solution comprising the polar liquid and a nonpolar liquid.

8. The hydrogel of claim 7, wherein the weight ratio of the N-isopropylacrylamide, N,N' Methylenebisacrylamide, and 2-hydroxy-2-methylpropiophenone in the NIPAM solution is 97:1:2.

9. The hydrogel of claim 7, wherein the concentration of the N-isopropylacrylamide, the MBAA, and the 2-hydroxy-2-methylpropiophenone in the NIPAM solution is 200 mg/ml.

10. The hydrogel of claim 7, wherein the concentration of 1H,1H,2H,2H-Perfluorodecyl acrylate in the solution in step (b) is 200 mg/ml.

11. The hydrogel of claim 7, wherein the weight ratio of 1H, 1H,2H,2H-Perfluorodecyl acrylate to N-isopropylacrylamide in the F-PNIPAM solution is 9:1.

12. The hydrogel of claim 1, in the form of a hollow tube or a cube.

* * * * *